(12) United States Patent
Bratt et al.

(10) Patent No.: US 11,127,110 B2
(45) Date of Patent: Sep. 21, 2021

(54) DATA PROCESSING SYSTEMS

(71) Applicants: ARM Limited, Cambridge (GB); APICAL LIMITED, Cambridge (GB)

(72) Inventors: Ian Rudolf Bratt, Portola Valley, CA (US); Alexander Eugene Chalfin, Mountain View, CA (US); Eric Kunze, Santa Clara, CA (US); Paul Stanley Hughes, Whittlesford (GB); Alex Kornienko, Loughborough (GB); Damian Piotr Modrzyk, Silesia (PL); Metin Gokhan Ünal, Gamston (GB); Jonathan Adam Lawton, Morgan Hill, CA (US)

(73) Assignees: Arm Limited, Cambridge (GB); Apical Limited, Cambridge (GB)

( * ) Notice: Subject to any disclaimer, the term of this patent is extended or adjusted under 35 U.S.C. 154(b) by 0 days.

(21) Appl. No.: 15/446,997

(22) Filed: Mar. 1, 2017

(65) Prior Publication Data

US 2018/0253868 A1 Sep. 6, 2018

(51) Int. Cl.
*G06T 1/60* (2006.01)
*G06T 3/00* (2006.01)
(Continued)

(52) U.S. Cl.
CPC ............... *G06T 1/60* (2013.01); *G06F 3/012* (2013.01); *G06T 3/0093* (2013.01); *G09G 5/36* (2013.01); *G09G 5/391* (2013.01); *G09G 5/395* (2013.01); *G09G 2340/0464* (2013.01); *G09G 2354/00* (2013.01)

(58) Field of Classification Search
None
See application file for complete search history.

(56) References Cited

U.S. PATENT DOCUMENTS 5,841,439 A * 11/1998 Pose ..................... G06T 15/005
345/418
6,662,256 B1 * 12/2003 Foo ..................... G06F 13/4256
710/305

(Continued)

FOREIGN PATENT DOCUMENTS

EP 3179447 6/2017
GB 2556634 6/2018
(Continued)

OTHER PUBLICATIONS

GB Combined Search and Examination Report dated Aug. 29, 2018, GB Patent Application GB1803300.1.

*Primary Examiner* — Aaron M Richer
(74) *Attorney, Agent, or Firm* — Vierra Magen Marcus LLP

(57) ABSTRACT

A display controller 93 in a data processing system includes a timewarp module (transformation circuitry) 100 that is operable to perform timewarp processing of a rendered frame 92 generated by a graphics processor (GPU) 91 for provision to a display panel 94. The timewarp module (transformation circuitry) 100 operates to transform an input surface 92 read by the display controller 93 based on received view orientation data to provide an appropriately "timewarped" transformed version of the input surface as an output transformed surface for display on the display 94.

26 Claims, 10 Drawing Sheets

(51) Int. Cl.
   *G09G 5/36* (2006.01)
   *G09G 5/395* (2006.01)
   *G09G 5/391* (2006.01)
   *G06F 3/01* (2006.01)

(56) References Cited

U.S. PATENT DOCUMENTS

| | | | |
|---|---|---|---|
| 9,576,397 B2* | 2/2017 | Johansson | G06T 19/006 |
| 2010/0091031 A1* | 4/2010 | Tsujimoto | G02B 27/017 |
| | | | 345/589 |
| 2011/0310102 A1* | 12/2011 | Chang | G06T 17/20 |
| | | | 345/423 |
| 2013/0314501 A1* | 11/2013 | Davidson | H04N 13/122 |
| | | | 348/46 |
| 2015/0262398 A1* | 9/2015 | Iskander | G06T 11/40 |
| | | | 345/420 |
| 2015/0379697 A1* | 12/2015 | Pohl | G06T 5/006 |
| | | | 345/589 |
| 2018/0053284 A1* | 2/2018 | Rodriguez | G06T 3/0093 |

FOREIGN PATENT DOCUMENTS

| | | |
|---|---|---|
| WO | 2017/147178 | 8/2017 |
| WO | 2017210111 | 12/2017 |

* cited by examiner

DATA PROCESSING SYSTEMS

BACKGROUND

The technology described herein relates to data processing systems, and in particular to the operation of data processing systems that display images on a display.

FIG. 1 shows an exemplary data processing system that comprises a host processor comprising a central processing unit (CPU) 7, a graphics processing unit (GPU) 2, a video codec 1, a display controller 5, and a memory controller 8. As shown in FIG. 1, these units communicate via an interconnect 9 and have access to off-chip memory 3. In this system the GPU 2, video codec 1 and/or CPU 7 will generate frames (images) to be displayed and the display controller 5 will then provide the frames to a display 4 for display.

In use of this system, an application 10 such as a game, executing on the host processor (CPU) 7 will, for example, require the display of frames on the display 4. To do this, the application 10 will submit appropriate commands and data to a driver 11 for the graphics processing unit 2 that is executing on the CPU 7. The driver 11 will then generate appropriate commands and data to cause the graphics processing unit 2 to render appropriate frames for display and to store those frames in appropriate frame buffers, e.g. in the main memory 3. The display controller 5 will then read those frames into a buffer for the display from where they are then read out and displayed on the display panel of the display 4.

FIG. 9 illustrates this and shows a GPU 91 generating a rendered frame 92 that it stores in memory in response to commands and data received from a host 90. As shown in FIG. 9, the rendered frame 92 is then subsequently read by the display controller 93 and provided to the display panel 94 for display.

An example of a use of a data processing system such as that illustrated in FIG. 1 is to provide a virtual reality (VR) head mounted display (HMD) system. (In this case, the display 4 will be a head-mounted display of some kind.)

In a head mounted virtual reality display operation, the appropriate images to be displayed to each eye will be rendered by the graphics processing unit 2, in response to appropriate commands and data from the application, such as a game, (e.g. executing on the CPU 7) that requires the virtual reality display. The GPU 2 will, for example, render the images to be displayed at a rate that matches the refresh rate of the display, such as 30 frames per second.

In such arrangements, the system will also operate to track the movement of the head/gaze of the user (so-called head pose tracking). This head orientation (pose) data is then used to determine how the images should actually be displayed to the user for their current head position (view direction), and the images (frames) are rendered accordingly (for example by setting the camera (viewpoint) orientation based on the head orientation data), so that an appropriate image based on the user's current direction of view can be displayed.

While it would be possible simply to determine the head orientation (pose) at the start of rendering a frame to be displayed in a VR system, because of latencies in the rendering process, it can be the case that the user's head orientation (pose) has changed between the sensing of the head orientation (pose) at the beginning of the rendering of the frame and the time when the frame is actually displayed (scanned out to the display panel).

To allow for this, a process known as "time warp" has been proposed for virtual reality head-mounted display systems. In this process, the frames to be displayed are rendered based on the head orientation data sensed at the beginning of the rendering of the frames, but then before the frames are actually displayed, further head orientation (pose) data is sensed, and that updated head pose sensor data is then used to render an "updated" version of the original frame that takes account of the updated head orientation (pose) data. The "updated" version of the frame is then displayed. This allows the image displayed on the display to more closely match the user's latest head orientation.

To do this processing, the initial, "application" frames are rendered into appropriate buffers in memory, but there is then a second rendering process that takes the initial, application frames in memory and uses the latest head orientation (pose) data to render versions of the initially rendered frames that take account of the latest head orientation to provide the frames that will be displayed to the user. This typically involves performing some form of transformation on the initial frames, based on the head orientation (pose) data. The so-"time warp" rendered frames that are actually to be displayed are written into a further buffer or buffers in memory, from where they are then read out for display by the display controller.

Both of these rendering operations are typically carried out by the graphics processing unit 2, under appropriate control from the CPU 7. Thus, for this processing, the graphics processing unit 2 will be required to perform two different rendering tasks, one to render the "application" frames as required and instructed by the application, and the other to then "timewarp" render those rendered frames appropriately based on the latest head orientation data into a buffer in memory for a reading out by the display controller 5 for display.

FIGS. 2 and 3 illustrate the "timewarp" process.

FIG. 2 shows the display of an exemplary frame 20 when the viewer is looking straight ahead, and the required "timewarp" projection of that frame 21 when the viewing angle of the user changes. It can be seen from this Figure that for the frame 21, a modified version of the frame 20 must be displayed.

FIG. 3 correspondingly shows the timewarp rendering 31 of application frames 30 to provide the "time warped" frames 32 for display. As shown in FIG. 3, a given application frame 30 that has been rendered may be subject to two timewarp processes 31 for the purpose of displaying the appropriate "timewarped" version 32 of that application 30 frame at successive intervals whilst waiting for a new application frame to be rendered. FIG. 3 also shows the regular sampling 33 of the head position (pose) data that is used to determine the appropriate "timewarp" modification that should be applied to an application frame 30 for displaying the frame appropriately to the user based on their head position.

The Applicants believe that there is scope for improved arrangements for performing "time warp" rendering for virtual reality displays in data processing systems.

BRIEF DESCRIPTION OF THE DRAWINGS

Various embodiments of the technology described herein will now be described by way of example only and with reference to the accompanying drawings, in which.

Like reference numerals are used for like components throughout the drawings, where appropriate.

DETAILED DESCRIPTION

Figure 1:
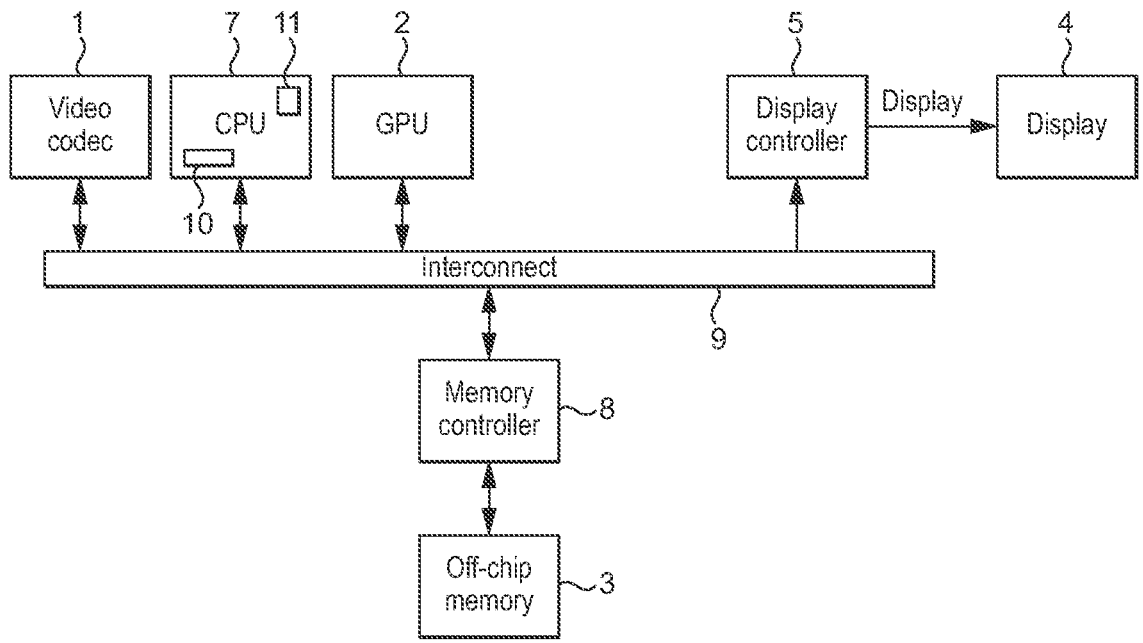
FIG. 1 shows an exemplary data processing system.
Figure 2:
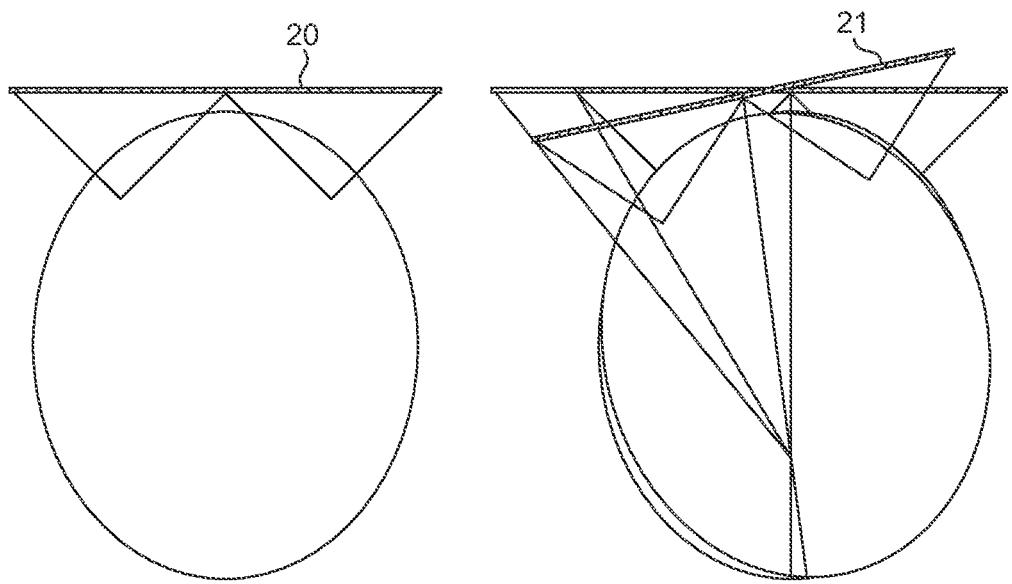
FIGS. 2 and 3 illustrate the process of "timewarp" rendering in a head-mounted virtual reality display system.
Figure 3:
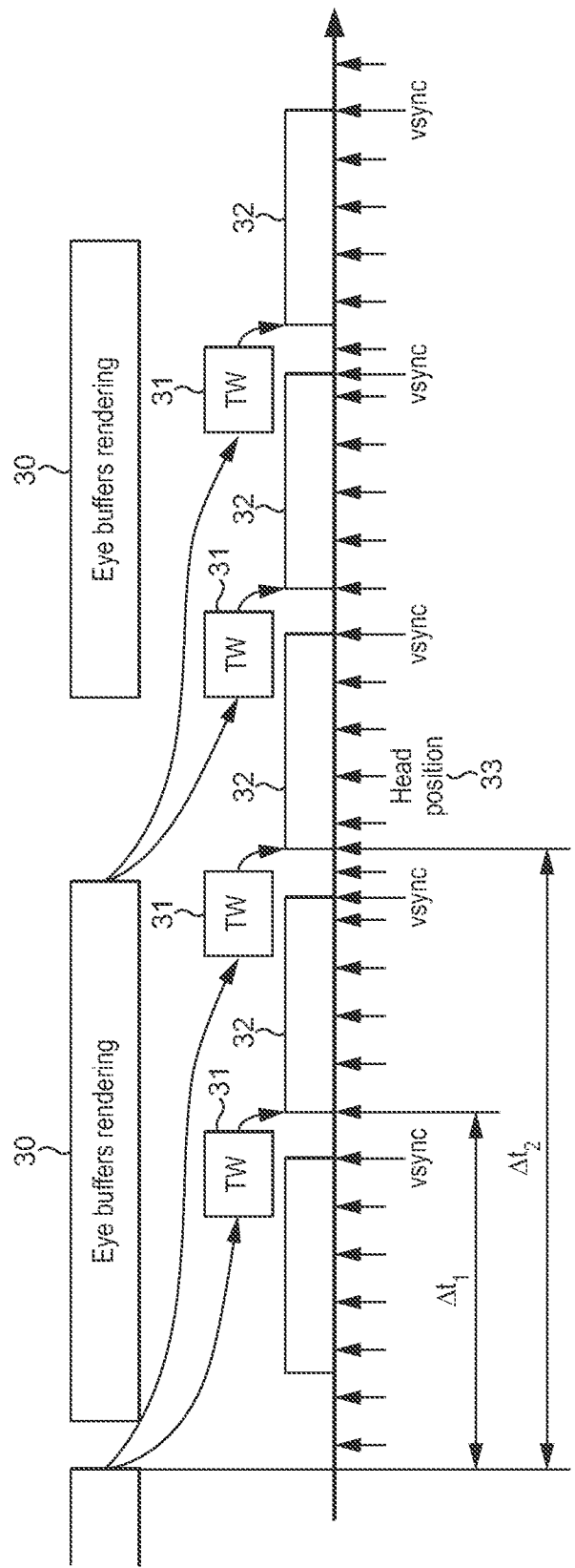

A first embodiment of the technology described herein comprises a display controller for a data processing system, the display controller comprising:
an input stage operable to read an input surface;
an output stage operable to provide an output surface for display to a display; and
a transformation stage operable to:
transform an input surface read by the input stage based on received view orientation data to provide a transformed version of the input surface as an output transformed surface; and
provide the output transformed surface to the output stage for providing as an output surface for display to a display.

A second embodiment of the technology described herein comprises a method of operating a display controller in a data processing system, the display controller including a transformation stage operable to transform an input surface based on received view orientation data to provide a transformed version of the input surface as an output transformed surface;
the method comprising:
the display controller reading an input surface;
the transformation stage of the display controller transforming the read input surface based on received view orientation data to provide a transformed version of the input surface as an output transformed surface; and
the display controller providing the output transformed surface to a display for display.

The technology described herein relates to a display controller that is operable to provide output surfaces for display to a display. As in conventional display controllers, the display controller of the technology described herein includes an input stage operable to read in at least one input surface (e.g. frame) and an output stage operable to provide an output surface (frame) for display to a display. However, in contrast with conventional display controllers, the display controller of the technology described herein further comprises a transformation stage operable to transform an input surface based on received view orientation data (e.g., and in an embodiment, head position (pose) (tracking) information) so as to provide a transformed version of an input surface for use as an output surface for display.

As will be discussed further below, the transformation stage means that the display controller of the technology described herein can perform the transformation processes required for timewarp rendering on an input surface itself, rather than those operations needing to be performed, e.g. by a graphics processing unit to provide a "timewarped" frame for display.

The Applicants have in particular recognised that it is possible to perform the timewarp transformation of a frame to be displayed in the display controller as part of the display processing operation for providing a frame for display, rather than having to first perform that processing elsewhere in the data processing system (e.g. on a graphics processing unit) before processing the frames for display.

Performing the timewarp transformation processes on the display controller as the timewarped frames are being displayed provides a number of advantages. For example, it avoids the "timewarp" processing of the application frames having to be performed on the GPU and written to memory from where they are then read out by the display controller. This can provide significant savings in terms of memory bandwidth, processing resources, power, etc.

It also removes the need for the graphics processing unit to perform the timewarp rendering of the application frames for display, thereby avoiding the need, for example, to have the graphics processing unit perform two rendering processes (one to render the application frames and the other to then perform the timewarp rendering of those application frames), and having to switch between those two rendering processes. The graphics processor can also be used exclusively for rendering the application frames, thereby removing the need to divert graphics processor resources to the "timewarp" operation.

The technology described herein also has the advantage that the transformation for the timewarp processing can be more closely synchronised with the display of the frames to the user, such that the display to the user can be more closely aligned with the user's current head position.

The technology described herein can also allow the timewarp rendering of an application frame to be displayed on a virtual reality headset to be performed, in effect, in real time as the display stream is being provided to the headset for display, and, accordingly, can allow adjustments to the displayed frame based on the user's head movement to be applied at a finer resolution, e.g., on a line-by-line basis, rather than, e.g., having to wait for the next frame to be displayed before any changes can be made.

This all facilitates providing an enhanced display to the user as compared to existing arrangements.

The input surface that the transformation stage transforms may be any suitable and desired such surface. In an embodiment the input surface is an input surface that is intended to be displayed on a display that the display controller is associated with. In an embodiment, the input surface is an image, e.g. frame, for display.

In an embodiment, the input surface that the transformation stage transforms comprises a frame generated for display for an application, such as a game, but which is to be displayed based on a determined view orientation after it has been initially rendered (e.g., and in an embodiment, which is to be subjected to "timewarp" processing).

The input surface (and each input surface) will comprise an array of data elements (sampling positions) (e.g. pixels), for each of which appropriate data (e.g. a set of colour values) is stored.

The input surface or surfaces can be generated as desired.

The input surface(s) is in an embodiment generated (rendered) by a graphics processing unit (a graphics processor) of the data processing system that the display controller is part of, but it could also or instead be generated or provided by another component or components of the overall data processing system, such as a CPU or a video processor, if desired.

The generated input surface is, as discussed above, in an embodiment stored, e.g. in a frame buffer, in memory, from where it is then read by the input stage of the display controller for processing by the display controller.

The memory where the input surface is stored may comprise any suitable memory and may be configured in any suitable and desired manner. For example, it may be a memory that is on-chip with the display controller or it may be an external memory. In an embodiment it is an external memory, such as a main memory of the overall data processing system. It may be dedicated memory for this purpose or it may be part of a memory that is used for other data as well. In an embodiment the at least one input surface is stored in (and read from) a frame buffer (e.g. an "eye" buffer).

The input stage of the display controller may comprise any suitable such stage operable to read data of an input surface from memory where that data is stored. In an embodiment, the input stage comprises a memory read sub-system, that in an embodiment comprises a read controller, such as for example a Direct Memory Access (DMA) read controller, configured to (operable to) read data of an input surface from a memory in which the input surface is stored.

In an embodiment the input stage is operable to fetch data of an input surface to be processed by the display controller from memory into a local buffer or buffers of the display controller (and thus the display controller in an embodiment comprises one or more local buffers operable to store data of an input surface or surfaces to be processed by the display controller). The transformation stage in an embodiment then processes the input surface from the local buffer or buffers.

Thus, in an embodiment, the transformation stage has an associated input buffer or buffers into which data of the input surface to be processed is loaded for then processing by the transformation stage.

Correspondingly, in an embodiment, the technology described herein comprises the input stage of the display controller loading data of an input surface to be processed from memory into a local (an input) buffer or buffers of the display controller, and the transformation stage then processing the input surface data from the local (input) buffer or buffers based on received view orientation data to provide the output transformed surface.

The local (input) buffer or buffers of the display controller that the input surface data is fetched into can be any suitable and desired local buffer memory of or accessible to the display controller. As will be discussed further below, the local buffer or buffers are in an embodiment able to (and operable to) store one or more, and in an embodiment plural, blocks of data elements (sampling (data) positions) of an input surface.

The local buffer or buffers could be provided specifically for the purpose of the technology described herein, or they could be a buffer or buffers that are already present in or for the display controller for other purposes, such as a buffer or buffers of a respective layer pipeline or pipelines of the display controller.

Thus, in one embodiment, the display controller comprises one or more, and in an embodiment a plurality, of input layer (surface) processing pipelines, and one or more of those input layer pipelines are used to store data for the input surface that is to be transformed by the transformation stage, and the transformation stage is operable to read the input surface data that it requires from a buffer or buffers of the appropriate input layer pipeline or pipelines.

The overall operation in an embodiment also comprises first rendering the input surface (e.g. by a graphics processing unit), and storing that input surface in the memory, from where it is then read by the input stage.

The transformation stage operates to transform an input surface based on received view orientation data.

The view orientation data can be any suitable and desired data that is indicative of a view orientation (view direction). In an embodiment, the view orientation data represents and indicates a desired view orientation (view direction) that the input surface is to be displayed as if viewed from (that the input surface that is to be transformed is to be displayed with respect to).

In an embodiment, the view orientation data indicates the orientation of the view position that the input surface is to be displayed for relative to a reference (e.g. predefined) view position (which may be a "straight ahead" view position but need not be).

The reference view position is in an embodiment the view position (direction (orientation)) that the input surface was generated (rendered) with respect to.

Thus, in an embodiment the view orientation data indicates the orientation of the view position that the input surface is to be displayed for relative to the view position (direction) that the input surface was generated (rendered) with respect to.

The view orientation data in an embodiment indicates a rotation of the view position that the input surface is to be displayed for relative to the reference view position. The view position rotation may be provided as desired, such as in the form of three (Euler) angles or as quaternions.

Thus, in an embodiment, the view orientation data comprises one or more (and in an embodiment three) angles (Euler angles) representing the orientation of the view position that the input surface is to be displayed for relative to a reference (e.g. predefined) view position.

The view orientation data may be provided to the display controller in use in any appropriate and desired manner. It is in an embodiment provided appropriately by the application that requires the display of the output transformed surface.

The view orientation data is in an embodiment provided to the transformation stage of the display controller periodically, e.g., at a selected, and in an embodiment predefined, rate, with the transformation stage then using the provided view orientation data as appropriate to control its transformation operation. In an embodiment, updated view orientation data is provided to the transformation stage at a rate of a few hundred hertz or so, such as 800 Hz.

The view orientation data that is used by the transformation stage when generating an output transformed surface from an input surface can be provided to (received by) the transformation stage in any suitable and desired manner. The view orientation data is in an embodiment written into suitable local storage (e.g. a register or registers) of the display controller from where it can then be read and used by the transformation stage when generating an output transformed surface from an input surface.

In an embodiment, the view orientation data comprises head position data (head pose tracking data), e.g., and in an embodiment, that has been sensed from appropriate head position (head pose tracking) sensors of a virtual reality display headset that the display controller is providing images for display to.

The, e.g. sampled, view orientation (e.g. head position (pose)) data is in an embodiment provided to the transformation stage of the display controller in an appropriate manner and at an appropriate rate (e.g., and in an embodiment, the same rate at which it is sampled by the associated head-mounted display). The transformation stage can then use the provided head pose tracking (view orientation) information as appropriate to control its transformation operation.

Thus, the view orientation data in an embodiment comprises appropriately sampled head pose tracking data that is, e.g., and in an embodiment, periodically determined by a virtual reality headset that the display controller is coupled to (and providing the output transformed surface for display to).

The display controller may be integrated into the headset (head-mounted display) itself, or it may otherwise be coupled to the headset, for example via a wired or wireless connection.

Thus, in an embodiment, the method of the technology described herein comprises (and the display controller and/or data processing system is appropriately configured to) periodically sampling view orientation data (e.g. head position data) for use by the transformation stage (e.g., and in an embodiment, by means of appropriate sensors of a head-mounted display that the display controller is providing the output transformed surface for display to), and periodically providing sampled view orientation data to the display controller (to the transformation stage of the display controller), with the transformation stage then using the provided sampled view orientation data when transforming an input surface to provide a transformed version of the input surface as an output transformed surface.

The transformation stage is in an embodiment configured to update its transformation operation based on new view orientation data (head tracking data) at appropriate intervals, such as at the beginning of each frame and/or after some number of lines of a given output transformed surface have been generated. In an embodiment the transformation stage updates its operation based on the latest provided view orientation (head tracking) information periodically, and in an embodiment each time a particular, in an embodiment selected, number of lines of a transformed output surface have been generated. This may be done for each new line in an output transformed surface, or it may be done, e.g., every few lines, e.g. every two or four lines, of the output transformed surface.

The transformation stage can operate to transform an input surface based on received view orientation data in any suitable and desired manner. In an embodiment, the transformation stage operates to, in effect, apply a transformation to the input surface based on the view orientation data.

The transformation that the transformation stage (in effect) applies to an input surface based on the view orientation data can be any suitable and desired transformation. In an embodiment, the transformation is so as to transform the input surface to provide a representation of the input surface as if viewed from the view orientation (view direction) indicated (represented) by the received view orientation data (as compared, e.g., to the view orientation (view direction) that the input surface was generated (rendered) with respect to).

In an embodiment, the transformation stage operates to generate a projection of the input surface based on the view orientation data, for example, and in an embodiment, a projection based on, and that corresponds to, the current view orientation as indicated by the view orientation data.

The transformation based on the view orientation data may, e.g., and in an embodiment does, comprise one or more of, and in an embodiment all of: an x/y shift, scaling, and rotation. More complex transformations could be used if desired. In an embodiment, the transformation based on the view orientation data comprises (solely) a planar rotation of the input surface based on the view orientation data.

In an embodiment, the transformation stage transforms the input surface based on (to take account of) one or more other factors, as well as the view orientation. In an embodiment, the transformation that the transformation stage applies to the input surface also takes account of (is based on) any distortion, e.g. barrel distortion, that will be caused by a lens or lenses through which the displayed output transformed surface will be viewed by a user.

The Applicants have recognised in this regard that the output frames displayed by virtual reality headsets are typically viewed through lenses, which lenses commonly apply geometric distortions, such as barrel distortion, to the viewed frames. Accordingly, it is desirable to be able to "pre-distort" the surface (frame) that is displayed, so as to compensate for the (geometric) distortion that the lens will cause.

Thus, in an embodiment, the transformation stage is operable to take account of (expected) (geometric) distortion from a lens or lenses that the transformed output surface will be viewed through, and to generate an output transformed surface from an input surface so as to compensate for (take account of) that (expected) lens (geometric) distortion.

Thus, in an embodiment, the transformation stage is operable to generate an output transformed surface from an input surface based on a particular, in an embodiment selected, in an embodiment predefined, lens (geometric) distortion (which lens distortion should be, and is in an embodiment, based on and corresponds to the geometric distortion that will be caused by the lenses that the output transformed surface will be viewed through by a user).

In an embodiment, the transformation that the transformation stage applies to an input surface to generate the output transformed surface also or instead (and in an embodiment also) takes account of (and is operable to try to correct) chromatic aberration (distortion) in the viewing path of the displayed output transformed surface.

The Applicants have again recognised in this regard that the lenses that the output frames displayed by virtual reality headsets will be viewed through may also introduce chromatic aberration to the viewed frames. Accordingly, it is desirable to be able to "pre-distort" the surface (frame) that is displayed, so as to compensate for any chromatic aberration that the lenses will cause.

Thus, in an embodiment, the transformation stage is operable to take account of (expected) chromatic aberration in the viewing path of the transformed output surface (e.g. from a lens or lenses that the transformed output surface will be viewed through), and to generate an output transformed surface from an input surface so as to compensate for (take account of) that (expected) chromatic aberration.

Thus, in an embodiment, the transformation stage is operable to generate an output transformed surface from an input surface based on a particular, in an embodiment selected, in an embodiment predefined, chromatic aberration (which chromatic aberration should be, and is in an embodiment, based on and corresponds to the chromatic aberration that will be caused by the lenses that the output transformed surface will be viewed through by a user).

In an embodiment, the chromatic aberration correction is determined separately for different colour planes of the input surface. In an embodiment, a separate chromatic aberration correction is determined for each colour plane of the input surface. In this case therefore, there will be respective red, green and blue (for example) chromatic aberration corrections determined and applied to the input surface by the transformation stage.

The Applicants have recognised in this regard that any chromatic aberration introduced by the viewing path through which the output transformed surface will be viewed will vary depending upon the colour in question. It is therefore advantageous to determine separate chromatic aberration corrections for each colour plane separately, rather than applying a single, common chromatic aberration correction to all the colour planes (although that could be done, if desired).

In an embodiment, where the input surface and the output transformed surface also include alpha (transparency) data (an alpha (transparency) plane), then the chromatic aberration correction determined for the one of the colour planes (in an embodiment the green colour plane) is also applied (and used for) the alpha (transparency) plane (values).

The transformation stage can generate an output transformed surface from an input surface in any suitable and desired manner.

The output transformed surface that the transformation stage generates will be a frame (e.g. an image) for display, and so will accordingly correspondingly comprise an array of data elements (sampling positions) (e.g. pixels) for which respective colour data is defined (and provided).

In an embodiment, the transformation stage operates to determine for a data element (sampling) (e.g. pixel) position in the output transformed surface, the corresponding position (coordinate) in the input surface from which the data for that data element (sampling position) in the transformed output surface should be taken. In other words, the transformation stage in an embodiment determines the position in the input surface that will be moved to that data element (sampling position) in the output transformed surface by the transformation that the transformation stage applies to the input surface.

This is in an embodiment done for plural, and in an embodiment for each, data element (sampling position) in the output transformed surface that it is desired to generate (for display).

The transformation stage can determine which input surface position should be sampled for a given transformed output surface data element (sampling) (e.g. pixel) position in any suitable and desired manner.

In an embodiment, the transformation stage determines for an output transformed surface data element (sampling) position x, y, the corresponding input surface position from which the data for that data element (sampling position) in the transformed output surface should be (is to be) taken based on one or more of, and in an embodiment all of: a lens distortion correction that the transformation operation is configured to apply to the input surface; a view orientation transformation that the transformation operation is configured to apply to the input surface; and a chromatic aberration correction that the transformation operation is configured to apply to the input surface.

In an embodiment, the transformation stage determines for an output transformed surface sampling position x, y, a corresponding input surface position (coordinate) (x', y') based on the lens distortion that the transformation operation is configured to take account of, and then modifies that determined input surface position (coordinate) (x', y') based on at least the view orientation data (i.e. to apply the necessary head tracking (view direction) transformation).

In an embodiment the determined input surface position (coordinate) is also modified to take account of chromatic aberration when viewing the output transformed surface (to apply a chromatic aberration correction). This is in an embodiment done before modifying the determined input surface position based on the view orientation data.

Correspondingly, in an embodiment, the transformation stage comprises a coordinate interpolator stage that is operable to determine for a sampling position (coordinate) in the output transformed surface that is to be output from the transformation stage, a corresponding input surface position (coordinate) for that output transformed surface sampling position (coordinate) based on a defined lens distortion; a chromatic aberration correction stage that is operable to modify an input surface position (coordinate) to account for chromatic aberration when viewing the output transformed surface on its display; and a view orientation transformation stage that is operable to modify an input surface position (coordinate) based on received view orientation data (e.g. indicative of the current head position of the viewer who is to view the output surface).

It is believed that such an arrangement for transforming an input surface to provide an output transformed surface by determining the position(s) (coordinates) in the input surface that should be used for a given sampling position (pixel) in the output transformed surface may be new and advantageous in its own right, and not just for use in a display controller for a display device. For example, it may be possible to provide such a transformation stage as a stand-alone module that can be included in an overall data processing system (e.g. system on-chip), and not necessarily solely within a display controller.

Thus, a further embodiment of the technology described herein comprises an apparatus for transforming an input surface to provide an output transformed surface based on received view orientation data, the apparatus comprising:

a coordinate interpolator stage operable to determine for a data element position in an output transformed surface that is to be output from the apparatus, a corresponding position in an input surface based on a defined lens distortion;

a chromatic aberration correction stage operable to modify an input surface position determined by the coordinate interpolator stage to account for chromatic aberration when viewing the output transformed surface to provide at least one modified input surface position; and a view orientation transformation stage operable to further modify the at least one modified input surface position determined by the chromatic aberration correction stage based on received view orientation data to provide an output input surface position to be sampled to provide data to use for the data element of the output transformed surface.

Correspondingly, a further embodiment of the technology described herein comprises a method of transforming an input surface to provide an output transformed surface based on received view orientation data, the method comprising:

determining for a data element position in an output transformed surface that is to be output, a corresponding position in an input surface based on a defined lens distortion;

modifying the determined input surface position to account for chromatic aberration when viewing the output transformed surface to provide at least one modified input surface position; and further modifying the determined at least one modified input surface position based on received view orientation data to provide an output position in the input surface to be sampled to provide data to use for the data element of the output transformed surface.

As will be appreciated by those skilled in the art, these embodiments of the technology described herein can, and in an embodiment do, include any one or more or all of the features of the technology described herein described herein, as appropriate.

As discussed above, in an embodiment the chromatic aberration correction stage is operable to determine separate chromatic aberrations for each different colour plane. Thus, in an embodiment, the process operates to determine an initial input surface position for the output transformed surface data element (sampling position) that is being generated based, e.g., and in an embodiment, on the lens distortion (as discussed above), but the chromatic aberration correction stage in an embodiment then determines plural (e.g., and in an embodiment three, one for each colour plane) modified input surface positions (coordinates) (that each account for a respective chromatic aberration).

In these arrangements, the subsequent modification of the input surface position based on the view orientation should be, and is in an embodiment, accordingly applied to each input surface position that has been generated (i.e. to each different colour plane input surface position).

In this case therefore there will be (and is in an embodiment) plural (e.g. 3), positions to be sampled in the input surface for a given output transformed surface sampling position, e.g., and in an embodiment, one input surface position for each different colour plane (colour value) that is to be generated for the output transformed surface.

Once the position or positions in the input surface whose data is to be used for a data element (sampling position) in the output transformed surface has been determined, then in an embodiment, the input surface is sampled at the determined position or positions, so as to provide the data values to be used for the data element (sampling position) in the output transformed surface.

The input surface may be sampled in any suitable and desired manner in this regard.

In an embodiment, the transformation stage is operable to determine the data value for a data element (sampling position) in the output transformed surface by interpolating the data value for the determined corresponding input surface position from the data values defined for a set of plural (e.g. four) input surface sampling positions surrounding that input surface position.

Accordingly, in an embodiment, the transformation stage is operable to interpolate data from defined sampling positions in the input surface to provide the data for an input surface position (coordinate) that is to be used for an output transformed surface data element (sampling) position (coordinate).

Thus, in an embodiment, the transformation stage further includes an interpolation stage that is operable to interpolate plural input surface sampling position values to provide an interpolated sampling position value for use for a data element (sampling position) in an output transformed surface.

The interpolation of the input surface sampling position data can be performed in any suitable and desired way. In an embodiment, bilinear interpolation is used, but other arrangements could be used, if desired.

In these arrangements, where different input surface positions (coordinates) are determined for different colour planes (to take account of chromatic aberration), then in an embodiment a separate set of data is accordingly interpolated for the output transformed surface data element (sampling position) for each colour plane based on the input surface position for that colour plane. Thus, for example, the set of RGB colour data for an output transformed surface data element (sampling position) will in an embodiment comprise a red value determined from one (a "red") input surface position (coordinate), a green value determined from another ("green") input surface position (coordinate), and a blue value determined from a third ("blue") input surface position (coordinate).

The so-separately determined colour plane (e.g. red, green and blue) values are in an embodiment then used together to provide the colour data for the output transformed surface data element (sampling position) in question.

Where an alpha (transparency) value is also to be determined, then, as discussed above, that is in an embodiment determined from the input surface position (coordinate) that is used to determine the green colour value.

It will be appreciated from the above that in an embodiment, the transformation stage operates by reading as an input one or more sampling positions (e.g. pixels) in the input surface and using those sampling positions to generate an output sampling position (e.g. pixel) of the output transformed surface. In other words, the transformation stage in an embodiment operates to generate the output transformed surface by generating the data values for respective sampling positions (e.g. pixels) in the output transformed surface from the data values for sampling positions (e.g. pixels) in the input surface.

(As will be appreciated by those skilled in the art, the defined sampling (data) positions (data elements) in the input surface (and in the output transformed surface) may (and in one embodiment do) correspond to the pixels of the display, but that need not necessarily be the case. For example, where the input surface and/or output transformed surface is subject to some form of downsampling, then there will be a set of plural data (sampling) positions (data elements) in the input surface and/or output transformed surface that corresponds to each pixel of the display, rather than there being a one-to-one mapping of surface sampling (data) positions to display pixels).)

Thus, in an embodiment, the transformation stage operates for a, and in an embodiment for plural, and in an embodiment for each, sampling position (data element) that is required for the output transformed surface, to determine for that output transformed surface sampling position, a set of one or more (and in an embodiment a set of plural) input surface sampling positions to be used to generate that output transformed surface sampling position, and then uses those determined input surface sampling position or positions to generate the output transformed surface sampling position (data element).

Generating respective sampling positions (data elements) in the output transformed surface in this way facilitates generating the output transformed surface on a sampling-by-sampling position (data element-by-data element) basis (e.g., and in an embodiment, as a sequence or stream of output sampling positions (data elements)). This is advantageous, because that effectively allows the output transformed surface to be generated in a manner that is consistent with the way that the display controller and the display processing pipeline of the display controller will normally handle surfaces for display (i.e. as a sequence or stream of sampling positions (data elements) (e.g. pixels), in contrast e.g., to blocks of sampling positions (pixels)).

Indeed, a particular advantage of these embodiments of the technology described herein is that they facilitate the generation of the output transformed surface as a stream of sampling positions of that surface, which thereby facilitates the ability to perform the timewarp rendering in the display controller as part of the display processing pipeline, in "real-time" as the output transformed surface is being displayed.

Thus, in an embodiment, the transformation stage operates to produce the output transformed surface on a sampling position-by-sampling position (e.g. pixel-by-pixel) basis.

Thus, in an embodiment, the transformation stage determines for a first sampling position (data element) in the output transformed surface, the sampling position or positions (data element or elements) in the input surface that are to be used to generate that output transformed surface sampling position, and then uses those input surface sampling position or positions to generate the output transformed surface sampling position, and then for a next (for a second) output transformed surface sampling position (data element), determines the sampling position or positions (data element or elements) in the input surface to be used to generate that next (second) output transformed surface sampling position, and uses those determined input surface sampling position or positions to generate the output transformed surface sampling position, and so on.

Thus, in an embodiment, the output of the transformation stage is a stream of output transformed surface sampling positions (sampling position values).

The transformation stage in an embodiment generates the output transformed surface from the input surface on a line-by-line (raster line-by-raster line) basis, as that is then the appropriate format for providing the output transformed surface to a display. Thus the transformation stage in an embodiment generates the output transformed surface as a sequence of rows of sampling positions (data elements) of the output transformed surface, with each row having a length corresponding to the number of desired sampling positions across the width for the output transformed surface, and a vertical height of one sampling position of the output transformed surface.

The Applicants have further recognised in this regard that while it may be the case that the transformation stage will produce the output transformed surface as a sequence of, e.g. horizontal, rows of that surface, because of the, e.g. barrel distortion e.g., that will be being compensated for by the transformation stage, it may, and indeed typically will not, be the case that a given row of the output transformed surface will solely use input surface sampling positions from a corresponding horizontal row in the input surface. Rather, a row of the output transformed surface will typically be formed from sampling positions taken from a curved line extending across the input surface.

In order to take account of this, and to facilitate being able to generate the output transformed surface as a contiguous sequence of sampling positions for rows of the transformed output surface in turn, in an embodiment, the transformation stage is operable to identify regions (and in an embodiment respective two-dimensional blocks (areas)) of the input surface whose data will be required for generating a row of the transformed output surface that is currently being generated, and to cause the input stage of the display controller to load the necessary input surface regions (blocks) into an input, e.g. local, buffer or buffers of the display controller so as to be available for use by the transformation stage when the corresponding output transformed surface sampling position or positions is to be generated.

The blocks (areas) of the input surface that are loaded in this regard may be any suitable and desired blocks (areas) of the input surface. Each block in an embodiment comprises an (two dimensional) array of defined sampling (data) positions (data elements) of the input surface and extends by plural sampling positions (data elements) in each axis direction. The blocks are in an embodiment rectangular, and in an embodiment square. The blocks may, for example, each comprise 4×4, 8×8 or 16×16 sampling positions (data elements) of the input surface.

In an embodiment, this is done by the transformation stage using the integer part of the input surface position that is to be sampled for an output transformed surface sampling position (data element) to identify a block (area) of the input surface whose data will be required for generating the output transformed surface sampling position, and then indicating that block position (e.g. integer value) to the input stage of the display controller to cause the input stage of the display controller to fetch the appropriate block of the input surface into a local buffer of the display controller from where the transformation stage will read the desired input surface sampling positions to generate the output transformed surface sampling position.

In an embodiment, the operation, e.g. the input stage, is configured to first determine whether the required input surface block is already present in the local buffer, and to only then fetch that input surface block from memory into the local buffer if it is determined that the input surface block is not already present in the local buffer. Correspondingly, in an embodiment, when a new input surface block is to be fetched into the local buffer, an input surface block that is already stored in the local buffer is, if necessary, evicted (is replaced by the new block), in an embodiment using an appropriate block replacement mechanism, such as a least recently used replacement process.

The output transformed surface generated by the transformation stage can be provided to the output stage as an output surface for display for providing as an output surface for display to a display in any suitable and desired manner.

In an embodiment, the output of the transformation stage (e.g. the stream of output transformed surface sampling positions (data elements)) is output appropriately to the remainder of the display processing pipeline for processing. For example, and in an embodiment, it may be, and in an embodiment is, provided to a further processing stage, e.g., and in an embodiment a composition stage, of the display controller for any desired further processing prior to display.

Thus, in an embodiment, providing the output transformed surface to the output stage for providing as an output surface for display comprises providing the output transformed surface to a further processing stage of the display controller and then providing the so-processed output transformed surface to the output stage (or, e.g., to a further processing stage) for providing as an output surface for display to a display. The output transformed surface may be provided to plural processing stages prior to being provided to the output stage, if desired.

In an embodiment the output of the transformation stage (e.g. the sampling positions for the output transformed surface generated by the transformation stage) are output from the transformation stage to an appropriate buffer (e.g. a latency hiding buffer, such as a FIFO), that acts as a, e.g. latency hiding, buffer between the transformation stage and subsequent stages of the display controller (e.g. the output stage and/or one or more processing stages prior to the output stage).

The output stage of the display controller of the technology described herein may be any suitable output stage operable to provide an output surface for display to a display, e.g. to cause the output surface for display to be displayed on the display. The output stage in an embodiment comprises a processing pipeline that performs the necessary display processing operations on the output surface to be displayed. The output stage in an embodiment comprises appropriate timing control functionality (e.g. it is configured to send pixel data to the display with appropriate horizontal and vertical blanking periods), for the display.

The transformation stage (and its respective stages, e.g. the coordinate interpolator stage, the chromatic aberration correction stage and the view orientation transformation stage may be implemented in any suitable and desired manner. For example, they may be provided by means of suitable programmable processing circuitry that can be programmed to operate in the desired manner. They may in this regard all be implemented by the same programmable processing circuitry that is respectively programmed to perform the different operations, or there may be separate programmable stages that are each programmable to operate in the desired manner.

However, in an embodiment, the transformation stage (and its respective individual stages) are not provided by means of programmable processing circuitry, but are instead provided as fixed function stages (fixed function processing circuitry) that is configured to perform the required processing operation. Thus, in an embodiment, the transformation stage (and each of its respective individual stages) are provided in the form of fixed function hardware units (circuitry) that is configured to be able to perform the operation required (and that does not execute (other than executes) a software program via programmable processing circuitry to perform the operation required).

The Applicants have recognised in this regard that providing fixed function circuitry operable to perform the transformations of the input surface (e.g. the various input surface position determinations) will allow the transformation stage to perform its operations at a known and reliable (e.g. fixed) rate, in contrast, e.g., to an arrangement where the operations are implemented by means of executing a suitable program using programmable circuitry, where there may be variable delays and latencies in use. This accordingly further facilitates performing the operation of the technology described herein in the display controller (in the display processing pipeline of the display controller) in real time.

In an embodiment, where fixed-function circuitry is used to perform the operations of the transformation stage, that fixed-function circuitry is arranged to have limited configurability in use. In particular, it is in an embodiment possible to vary one or more control parameters for the operation that the circuitry performs, so as to facilitate some variation in and configuration of the operation of the fixed-function circuitry. Thus, in an embodiment, the operation of the transformation stage is implemented by means of fixed-function processing circuitry but which is configurable by setting one or more particular, in an embodiment selected, control parameters for that circuitry in use.

For example, where, e.g. a stage of, the transformation stage is operable to transform an input surface so as to compensate for potential lens (geometric) distortion, the circuitry could be configured to perform a general "lens distortion" compensation process, but with the exact parameters of the process that is performed being set by means of one or more control parameters that can be set in use. For example, the lens distortion could be controlled and represented using a 2D grid with reference points that approximates the lens distortion.

Similarly, where, e.g. a stage of, the transformation stage is operable to transform an input surface so as to compensate (correct) for potential chromatic aberration, the circuitry could be configured to perform a general "chromatic aberration" compensation (correction) process, but with the exact parameters of the process that is performed being set by means of one or more control parameters that can be set in use.

Equally, where, e.g. a stage of, the transformation stage is operable to transform an input surface based on a received view orientation, the circuitry could be configured to perform a general "view orientation" transformation process, but with the exact parameters of the process that is performed being set by means of one or more control parameters (e.g. Euler angles or quaternions) that can be set in use.

In these arrangements, the control parameters for the transformation stage may be set as desired. For example, where the display controller is configured to operate with only a particular, given virtual reality head-mounted display (e.g. is provided as part of a fixed virtual reality head-mounted display system), then control parameters for the transformation stage may be set as part of an initial set-up process and so as not to be changeable in use (i.e. the transformation stage may simply be pre-configured to perform the appropriate operation, e.g. lens distortion correction, etc., for the display system in question).

In an embodiment, the control parameters for the transformation stage can be, and are in an embodiment, set in use, e.g., and in an embodiment, by an application that is providing input surfaces to the display controller for display, and/or by the driver for the display controller.

This would then allow, e.g., the display controller to be used with different headsets, and for its, e.g. lens distortion correction, etc., to be set in use, e.g. by the driver, based on the current head-mounted display that the display controller is being used with (coupled to).

Any other operations, such as chromatic aberration correction, that are to be applied by the transformation stage could similarly be configured (i.e. either pre-configured (pre-stored) for "fixed" operation, or, e.g., and in an embodiment, settable in use, e.g. by the driver, to take account of different use situations for the display controller).

As well as the input stage, output stage and transformation stage discussed above, the display controller of the technology described herein can otherwise include any one or more or all of the processing stages and elements that a display controller may suitably comprise.

As discussed above, in an embodiment, the display controller comprises a processing stage or stages operable to process a surface or surfaces, e.g. to generate an output surface.

The processing stage or stages are in an embodiment operable to perform one or more, and in an embodiment all, of: composing (two or more) input surfaces to generate a composited output surface; decoding (e.g. decompressing)

an input surface, e.g. to generate one or more decoded (e.g. decompressed) input surfaces; rotating an input surface, e.g. to generate one or more rotated input surfaces; and scaling (e.g. upscaling and/or downscaling) one or more surfaces, e.g. to generate one or more scaled surfaces.

These operations may be performed by the same processing stages, or there may be, e.g., respective separate compositing, decoding (decompressing), rotation and/or scaling, stages, if desired. It would also be possible to provide some or all of this functionality in the input stage, if desired.

The display controller in an embodiment further comprises one or more layer pipelines operable to perform one or more processing operations on one or more input surfaces, as appropriate, e.g. before providing the one or more processed input surfaces to the transformation stage, a scaling stage and/or composition stage, or otherwise. Where the display controller can handle plural input layers, there may be plural layer pipelines, such as a video layer pipeline or pipelines, a graphics layer pipeline, etc. These layer pipelines may be operable, for example, to provide pixel processing functions such as pixel unpacking, colour conversion, (inverse) gamma correction, and the like.

The display controller may also include a post-processing pipeline operable to perform one or more processing operations on one or more surfaces, e.g. to generate a post-processed surface. This post-processing may comprise, for example, colour conversion, dithering, and/or gamma correction.

In an embodiment, the display controller further comprises a write-out stage operable to write an output surface to external memory. This will allow the display controller to, e.g., (selectively) write an output surface to external memory (such as a frame buffer), e.g., and in an embodiment, at the same time as an output surface is being displayed on the display.

In such an arrangement, in an embodiment, the display controller accordingly operates both to display the output transformed surface and to write it out to external memory (as it is being generated and provided by the transformation stage). This may be useful where, for example, an output transformed (timewarped) surface may be desired to be generated by applying a set of difference values to a previous ("reference") output transformed surface. In this case the write-out stage of the display controller could, for example, be used to store the "reference" output transformed surface in memory, so that it is then available for use when generating future output transformed surfaces.

Other arrangements would, of course, be possible.

The various stages of the display controller may be implemented as desired, e.g. in the form of one or more fixed-function units (hardware) (i.e. that is dedicated to one or more functions that cannot be changed), or as one or more programmable processing stages, e.g. by means of programmable circuitry that can be programmed to perform the desired operation. There may be both fixed function and programmable stages.

One or more of the various stages of the display controller may be provided as separate circuit elements to one another. Additionally or alternatively, some or all of the stages may be at least partially formed of shared circuitry.

It would also be possible for the display controller to comprise, e.g., two display processing cores, with one or more or all of the cores being configured in the manner of the technology described herein, if desired.

The display that the display controller of the technology described herein is used with may be any suitable and desired display (display panel), such as for example, a screen. It may comprise the overall data processing system's (device's) local display (screen) and/or an external display. There may be more than one display output, if desired.

In an embodiment, the display that the display controller is used with comprises a virtual reality head-mounted display. That display accordingly in an embodiment comprises a display panel for displaying the output transformed surfaces generated in the manner of the technology described herein to the user, and a lens or lenses through which the user will view the displayed transformed output frames.

Correspondingly, the display in an embodiment has associated view orientation determining (e.g. head tracking) sensors, which, in an embodiment periodically, generate view tracking information based on the current and/or relative position of the display, and are operable to provide that view orientation data periodically to the display controller (to the transformation stage of the display controller) for use when transforming an input surface to provide an output transformed surface for display.

In an embodiment, the display controller of the technology described herein forms part of a data processing system. Thus, another embodiment of the technology described herein comprises a data processing system comprising a display controller that is in accordance with the technology described herein.

The data processing system may and in an embodiment does also comprise one or more of, and in an embodiment all of: a central processing unit, a graphics processing unit, a video processor (codec), a system bus, and a memory controller.

The display controller and/or data processing system may be, and in an embodiment is, configured to communicate with one or more of (and the technology described herein also extends to an arrangement comprising one or more of): an external memory (e.g. via the memory controller), one or more local displays, and/or one or more external displays. The external memory in an embodiment comprises a main memory (e.g. that is shared with the central processing unit (CPU)) of the overall data processing system.

Thus, in some embodiments, the display controller and/or data processing system comprises, and/or is in communication with, one or more memories and/or memory devices that store the data described herein, and/or store software for performing the processes described herein. The display controller and/or data processing system may also be in communication with and/or comprise a host microprocessor, and/or with and/or comprise a display for displaying images based on the data generated by the display controller.

Correspondingly, a further embodiment of the technology described herein comprises a data processing system comprising:
a main memory;
a display;
one or more processing units operable to generate input surfaces for display and to store the input surfaces in the main memory; and
a display controller, the display controller comprising:
an input stage operable to read an input surface stored in the main memory;
an output stage operable to provide an output surface for display to a display; and
a transformation stage operable to:
transform an input surface read by the input stage based on received view orientation data to provide a transformed version of the input surface as an output transformed surface; and provide the output transformed surface to the output stage for providing as an output surface for display to a display.

As will be appreciated by those skilled in the art, these embodiments of the technology described herein can and in an embodiment do include one or more, and in an embodiment all, of the features of the technology described herein described herein.

Thus, for example, the display controller in an embodiment further comprises one or more local buffers, and its input stage is in an embodiment operable to fetch data of input surfaces to be processed by the display controller from the main memory into the local buffer or buffers of the display controller (for then processing by the transformation stage).

In use of the display controller and data processing system of the technology described herein, one or more input surfaces will be generated, e.g., and in an embodiment, by a GPU, CPU and/or video codec, etc. and stored in memory. Those input surfaces will then be processed by the display controller to provide an output surface for display to the display.

Although the technology described herein has been described above with particular reference to the generation of a single output transformed surface from an input surface, as will be appreciated by those skilled in the art, in embodiments of the technology described herein at least, there will be plural input surfaces being generated, representing successive frames of a sequence of frames to be displayed to a user. The transformation stage of the display controller will accordingly in an embodiment operate to provide a sequence of plural output transformed surfaces for display. Thus, in an embodiment, the operation in the manner of the technology described herein is used to generate a sequence of plural output transformed surfaces for display to a user. Correspondingly, the operation in the manner of the technology described herein is in an embodiment repeated for plural output frames to be displayed, e.g., and in an embodiment, for a sequence of frames to be displayed.

The generation of output transformed surfaces may also, accordingly, and correspondingly, comprise generating a sequence of "left" and "right" output transformed surfaces to be displayed to the left and right eyes of the user, respectively. Each pair of "left" and "right" output transformed surfaces may be generated from a common input surface, or from respective "left" and "right" input surfaces, as desired.

The technology described herein can be implemented in any suitable system, such as a suitably configured microprocessor based system. In an embodiment, the technology described herein is implemented in a computer and/or micro-processor based system.

The technology described herein is in an embodiment implemented in a virtual reality display device such as, and in an embodiment, a virtual reality headset. Thus, another embodiment of the technology described herein comprises a virtual reality display device comprising the display controller and/or data processing system of any one or more of the embodiments of the technology described herein. Correspondingly, another embodiment of the technology described herein comprises a method of operating a virtual reality display device, comprising operating the virtual reality display device in the manner of any one or more of the embodiments of the technology described herein.

The various functions of the technology described herein can be carried out in any desired and suitable manner. For example, the functions of the technology described herein can be implemented in hardware or software, as desired.

Thus, for example, unless otherwise indicated, the various functional elements, stages, and "means" of the technology described herein may comprise a suitable processor or processors, controller or controllers, functional units, circuitry, processing logic, microprocessor arrangements, etc., that are operable to perform the various functions, etc., such as appropriately dedicated hardware elements (processing circuitry), and/or programmable hardware elements (processing circuitry) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry, etc., if desired.

Furthermore, any one or more or all of the processing stages of the technology described herein may be embodied as processing stage circuitry, e.g., in the form of one or more fixed-function units (hardware) (processing circuitry), and/or in the form of programmable processing circuitry that can be programmed to perform the desired operation. Equally, any one or more of the processing stages and processing stage circuitry of the technology described herein may be provided as a separate circuit element to any one or more of the other processing stages or processing stage circuitry, and/or any one or more or all of the processing stages and processing stage circuitry may be at least partially formed of shared processing circuitry.

It will also be appreciated by those skilled in the art that all of the described embodiments of the technology described herein can, and in an embodiment do, include, as appropriate, any one or more or all of the features of the technology described herein described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising software code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a display controller, or microprocessor system comprising a data processor causes in conjunction with said data processor said controller or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible, non-transitory medium, such as a computer readable medium, for example, diskette, CD-ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

A number of embodiments of the technology described herein will now be described.

The technology described herein and the present embodiment relates to the process of displaying frames to a user in a virtual reality display system, and in particular in a head-mounted virtual reality display system.

Such a system may be configured as shown in FIG. 1 (and described above), with the display 4 of the system comprising an appropriate head-mounted display that includes, inter alia, a display screen or screens (panel or panels) for displaying frames to be viewed to a user wearing the head-mounted display, one or more lenses in the viewing path between the user's eyes and the display screens, and one or more sensors for tracking the position (pose) of the user's head (and/or their view (gaze) direction) in use (while images are being displayed on the display to the user).

Figure 8:
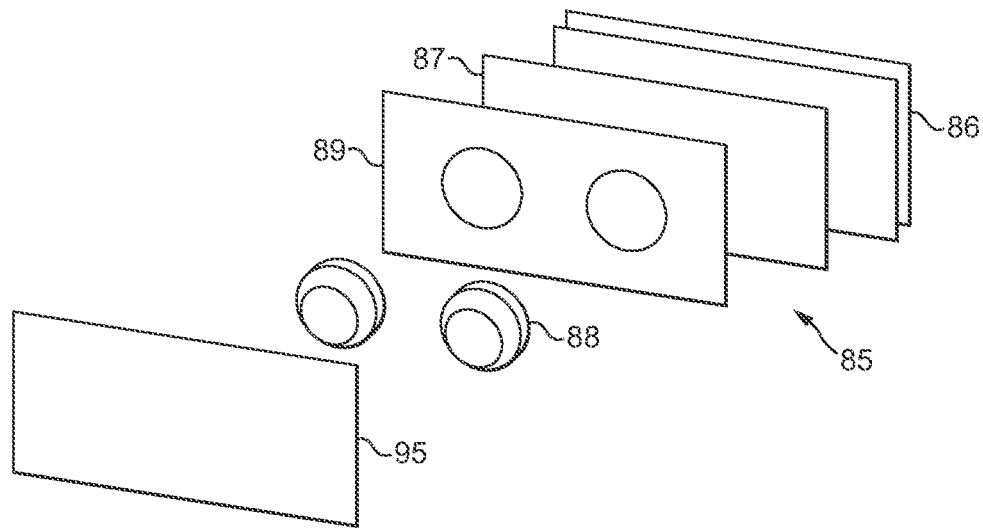
FIG. 8 shows schematically an exemplary virtual reality head mounted display headset.
Figure 9:
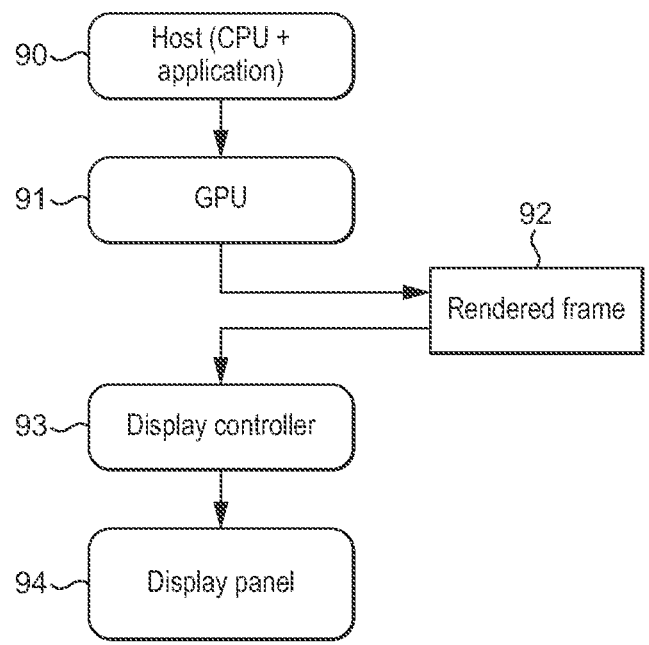
FIG. 9 shows schematically the provision of frames for display in a data processing system.

FIG. 8 shows schematically an exemplary virtual reality head-mounted display 85. As shown in FIG. 8, the head-mounted display 85 comprises, for example, an appropriate display mount 86 that includes one or more head pose tracking sensors, to which a display screen (panel) 87 is mounted. A pair of lenses 88 are mounted in a lens mount 89 in the viewing path of the display screen 87. Finally, there is an appropriate fitting 95 for the user to wear the headset.

In the system shown in FIG. 1, the display controller 5 will operate to provide appropriate images to the display 4 for viewing by the user. The display controller may be coupled to the display 4 in a wired or wireless manner, as desired.

Images to be displayed on the head-mounted display 4 will be, e.g., rendered by the graphics processor (GPU) 2 in response to requests for such rendering from an application 10 executing on a host processor (CPU) 7 of the overall data processing system and store those frames in the main memory 3. The display controller 5 will then read the frames from memory 3 as input surfaces and provide those frames appropriately to the display 4 for display to the user.

Figure 10:
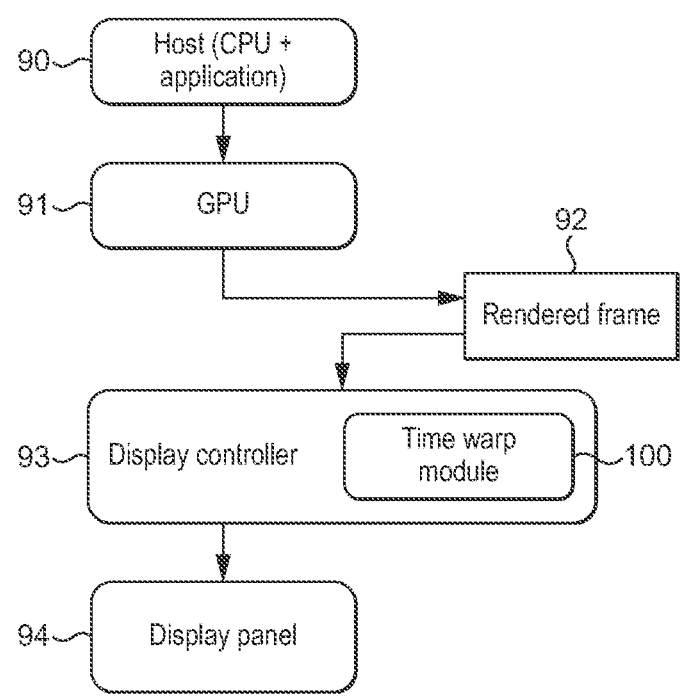
FIG. 10 shows schematically the provision of frames for display in a data processing system in an embodiment of the technology described herein.
Figure 11:
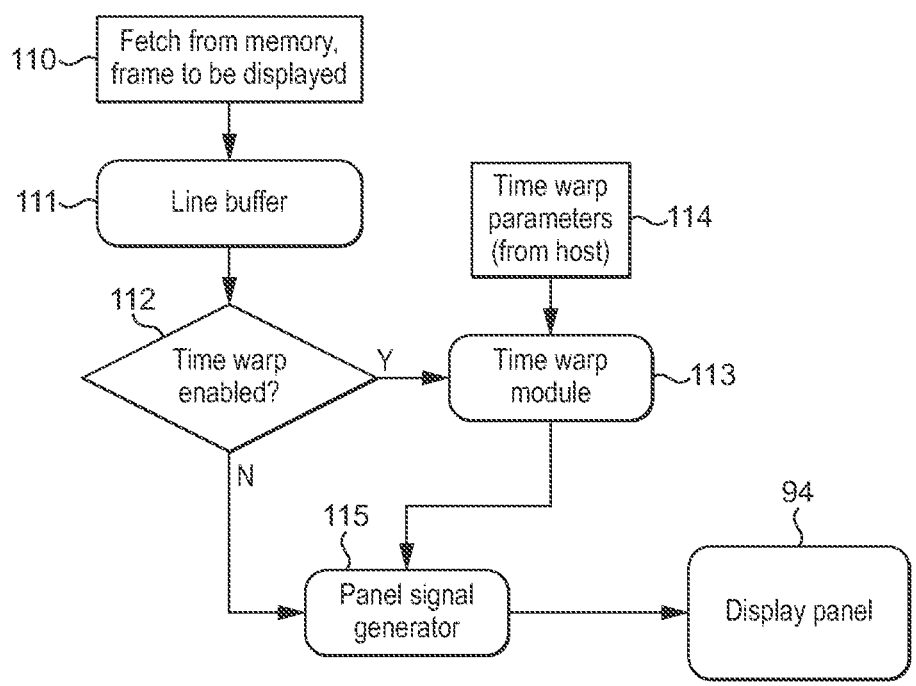
FIG. 11 shows schematically the provision of frames for display in a data processing system in an embodiment of the technology described herein in more detail.

In the present embodiment, and in accordance with the technology described herein, the display controller 5 is operable to be able to perform so-called "timewarp" processing on the frames stored in the memory 3 before providing those frames to the display 4 for display to a user. FIGS. 10 and 11 illustrate this.

As shown in FIG. 10, the display controller 93 includes a timewarp module (transformation stage) 100 that is operable to perform timewarp processing of a rendered frame 92 generated by the graphics processor (GPU) 91 for provision to the display panel 94.

FIG. 11 shows the operation of the display controller when performing the timewarp processing. As shown in FIG. 11, the rendered frame 92 to be displayed is first fetched from the memory (step 110) and then loaded into an appropriate buffer, such as a line buffer, of the display controller 93 (step 111).

It is then determined whether the timewarp processing is enabled (step 112). (If the timewarp processing is not enabled, then the loaded input frame is provided to the display 94 for display in the normal manner.)

If the timewarp processing is enabled, then the fetched input frame is processed by a timewarp module (transformation stage) of the display controller on the basis of appropriate timewarp parameters 114 provided from the host processor 90, to provide an appropriately "timewarped" version of the frame to be displayed (step 113). The "timewarped" frame is then provided in the normal manner to the remainder of the display processing pipeline (to the panel signal generator 115) for provision to the display 94 for display.

The configuration of the display controller 5 for performing the "time warp" operation, and the process of this operation, in the present embodiment, will now be described in more detail.

Figure 4:
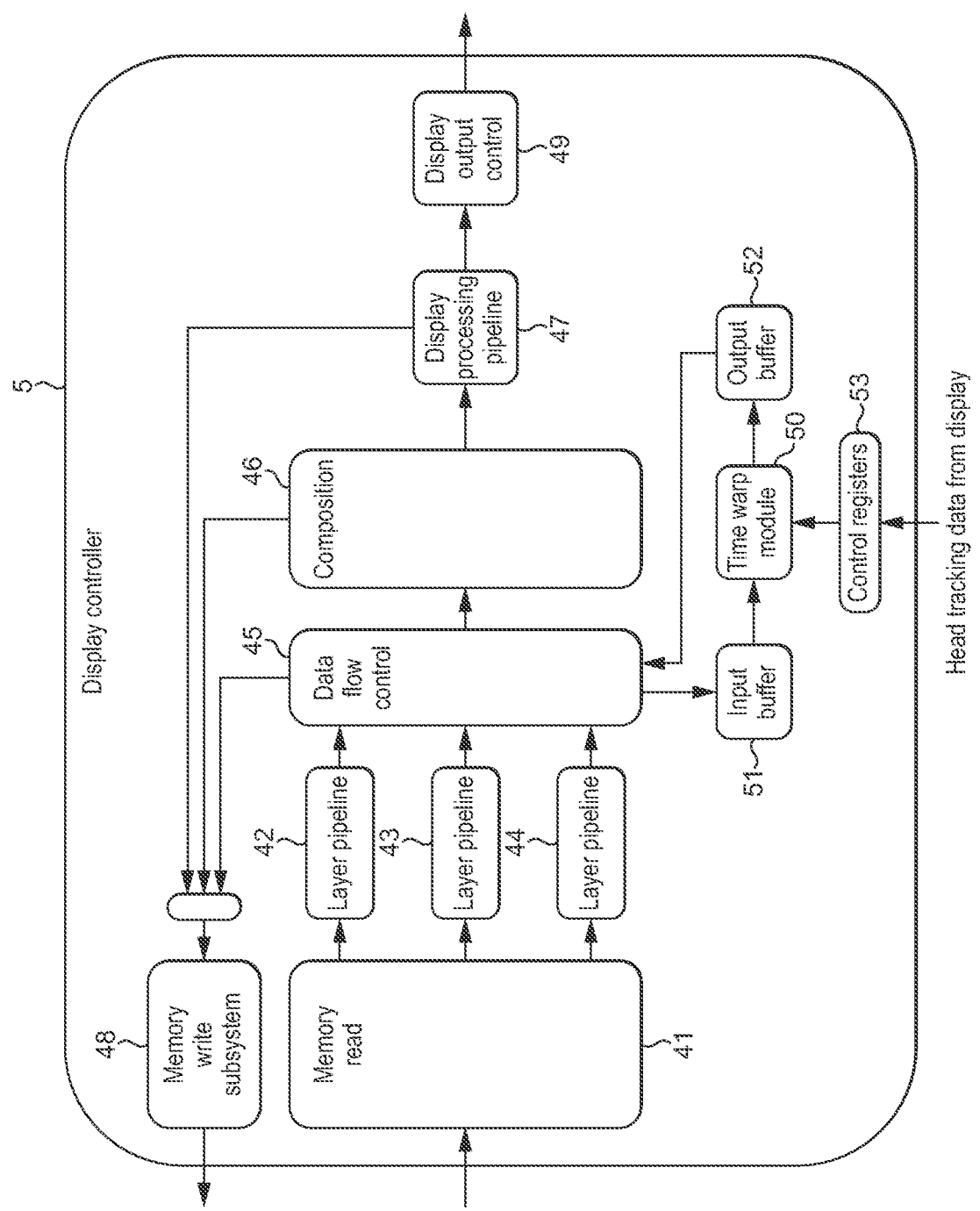
FIG. 4 shows schematically a display controller that can be operated in accordance with an embodiment of the technology described herein.

FIG. 4 shows schematically the display controller 5 in more detail. In FIG. 4, the boxes represent functional units of the display controller, while the arrowed lines represent connections between the various functional units.

As shown in FIG. 4, the display controller 5 comprises a memory read subsystem 41 that includes, inter alia, a read controller in the form of a Direct Memory Access (DMA) read controller. The read controller is configured to read one or more input surfaces from one or more frame buffers in the main memory 3 (not shown in FIG. 4) via the memory bus 9.

The memory read subsystem 41 further comprises one or more real-time FIFO (first-in-first-out) modules which are used to buffer locally the one or more input surfaces as they are read from memory, e.g. for latency hiding purposes.

In this embodiment, the memory read subsystem 41 is configured to provide (read) up to three different input surfaces for use as input layers which are to be used to generate a composited output frame. The three input layers may comprise one or more video layers, e.g. generated by the video processor (codec) 1, and one or more graphics layers, e.g. graphics windows generated by the graphics processing unit (GPU) 2, and so on. Hence, FIG. 4 shows the display controller 5 comprising three layer pipelines 42, 43, 44 which will each receive data from an input surface to be used as a display layer. Any or all of the input surfaces received by the layer pipelines may have been subjected to decoding by a decoder and/or rotation by a rotation unit, if desired.

Each layer pipeline 42, 43, 44 performs appropriate operations on the received surfaces, such as pixel unpacking from the received data words, colour (e.g. YUV to RGB) conversion, and inverse gamma or inverse sRGB correction.

Although the embodiment of FIG. 4 illustrates the use of three layer pipelines (and therefore up to three input layers), it will be appreciated that any number of layer pipelines may be provided and used in the technology described herein, depending on the application in question (and also depending on any silicon area constraints, etc.).

The layer processing pipelines 42, 43, 44 act as a processing stage of the display controller 5 that takes data of input surfaces read by the memory read subsystem 41 and produces from that data output surfaces, e.g. for display.

The display controller 5 further comprises a composition unit (display compositor) 46 that can receive inputs from the layer pipelines 42, 43, 44 and operates to compose the received input layers to generate a composited output surface, e.g. by appropriate alpha blending operations, etc.

The composited output frames from the composition unit 46 are onwardly transmitted to a display processing (post-processing) pipeline 47 for display, and/or to a memory write sub-system 48, as desired.

The display pipeline 47 is configured to selectively carry out any desired processing operation(s) on the composited output surface (frame), and to then transmit the (processed) composited output frame for appropriate display on the associated display.

The display processing pipeline 47 may, for example, comprise a colour conversion stage operable to apply a colour conversion to the composited output frame, a dithering stage operable to apply dithering to the composited output frame, and/or a gamma correction stage operable to carry out gamma correction on the composited output frame.

The display processing pipeline 47 also comprises appropriate display timing functionality. Thus, the display processing pipeline 47 is configured to send pixel data to the display outputs 49 with e.g. appropriate horizontal and vertical blanking periods. For example, horizontal and vertical synchronization pulses (HSYNC, VSYNC) may be generated together with a DATAEN signal which is asserted in non-blanking periods. In blanking periods DATAEN is de-asserted and no data is sent to the display (there are 4 blanking periods: horizontal front porch—before the HSYNC pulse, horizontal back porch—after the HSYNC pulse, vertical front porch—before the VSYNC pulse, and vertical back porch—after the VSYNC pulse).

It would also be possible to use other display timing and data (pixel) packing schemes, such as MIPI DPI, HDMI, Display Port, etc., if desired.

The display output 49 may, e.g. interface with a local display of the data processing system (e.g. of the mobile device, smart phone, tablet, etc., that the data processing system is part of).

The display processing pipeline 47 and display output control interface 49 accordingly act as an output stage for the display controller 5 for providing output surfaces for display to the display 4.

The memory write subsystem 48 of the display controller 5 is operable to write surfaces, e.g. generated by the composition unit 46, that it receives, out to external memory 3 (a frame buffer in external memory 3) via a memory bus. This then allows the display controller 5 to, as well as providing output frames for display, also write those output frames to main memory, if desired. To facilitate this operation, the memory write subsystem 48 includes a DMA write controller. In the present embodiment it also comprises appropriate FIFOs to act as latency hiding buffers.

The display controller 5 also includes a data flow control module 45 that is operable to direct the data flows through the display controller, i.e. to provide the input layers, composited output surfaces, etc., to the appropriate units for processing as shown in FIG. 4. In the present embodiment, the data flow controller 45 operates under appropriate software control, e.g., and in an embodiment, from a driver 11 for the display controller that is running on a host processor (e.g. the CPU 7) of the overall data processing system that the display controller 5 is part of. The driver may generate appropriate commands for the data flow controller 45 and program control registers of the display controller 5 in response to, e.g., commands and data for display processing received from an application running on the host processor.

Other arrangements in this regard, would, of course, be possible.

As discussed above, when the display controller 5 is to provide an output frame for display, it will read in data of one or more input surfaces that have been generated, e.g., by video codec 1 and/or GPU 2, and which are stored in respective frame buffers in the main memory 3, to act as input layers in its output surface generation process, process that input surface data (e.g. by compositing it into an output frame) and provide the (composited) output frame to the display 4 for display via the display processing pipeline 47.

This process is repeated for each frame that needs to be displayed, e.g. at a rate of 30 or 60 frames per second.

As such display processing is a real-time operation, the display controller 5 needs to deliver the pixel data to be displayed to the display 4 (to the display output) regularly, in each clock cycle triggering the display output from the display controller.

As well as the functionality discussed above, in the present embodiments, the display controller 5 includes scaling functionality (scalers) in each of its input layer pipelines 42, 43, 44 and in the output, display processing pipeline 47 (not shown).

As shown in FIG. 4, the display controller 5 of the present embodiments further includes a transformation stage 50 in the form of a timewarp module 50 that has an associated input buffer 51 and an associated output buffer 52. The timewarp module 50 is operable to transform an input surface that it receives via the input buffer 51 to provide an appropriately "timewarped" version of that input surface, which is then provided via the output buffer 52 to the display for display.

The required input surface data is loaded into the input buffer 51 by the driver controlling the memory read subsystem 41 to read appropriate data for the input surface from the main memory and provide it to the layer pipelines for provision by the data flow control module 45 to the input buffer 51.

As shown in FIG. 4, the data flow control module 45 is operable to direct input surface data processed by the layer pipelines 42, 43 and/or 44 appropriately to the input buffer 51 for processing by the timewarp module 50, and to then direct data from the output buffer 52 appropriately to the composition unit 46 and thence to the display processing pipeline 47 for display. This may again be appropriately controlled and configured by the driver.

The data flow control module 45 can also direct data of the timewarp output transformed surface to the memory write subsystem 48 for writing out to external memory, if desired. This may be appropriate where subsequent frames for display are generated based on differences with previous frames.

Although the input buffer 51 and output buffer 52 are shown as separate buffers in FIG. 4, those buffers could also be provided via other buffers that may be present in the display controller 5, if desired, such as buffers that may be present in the layer pipelines, for example.

As shown in FIG. 4, the transformation stage (timewarp module) 50 also has an associated set of control registers 53 via which appropriate control parameters for the timewarp transformation process can be set, e.g., and in an embodiment, under the control of the driver 11. As shown in FIG. 4, the registers receive and store, inter alia, appropriate head tracking data (parameters) that are received from the head-mounted display. Other control parameters, for example indicative of the lenses and/or any other configuration parameters of the head-mounted display, may also be stored in the registers 53 so as to control the operation of the transformation stage (timewarp module) 50.

Other arrangements would, of course, be possible.

Figure 5:
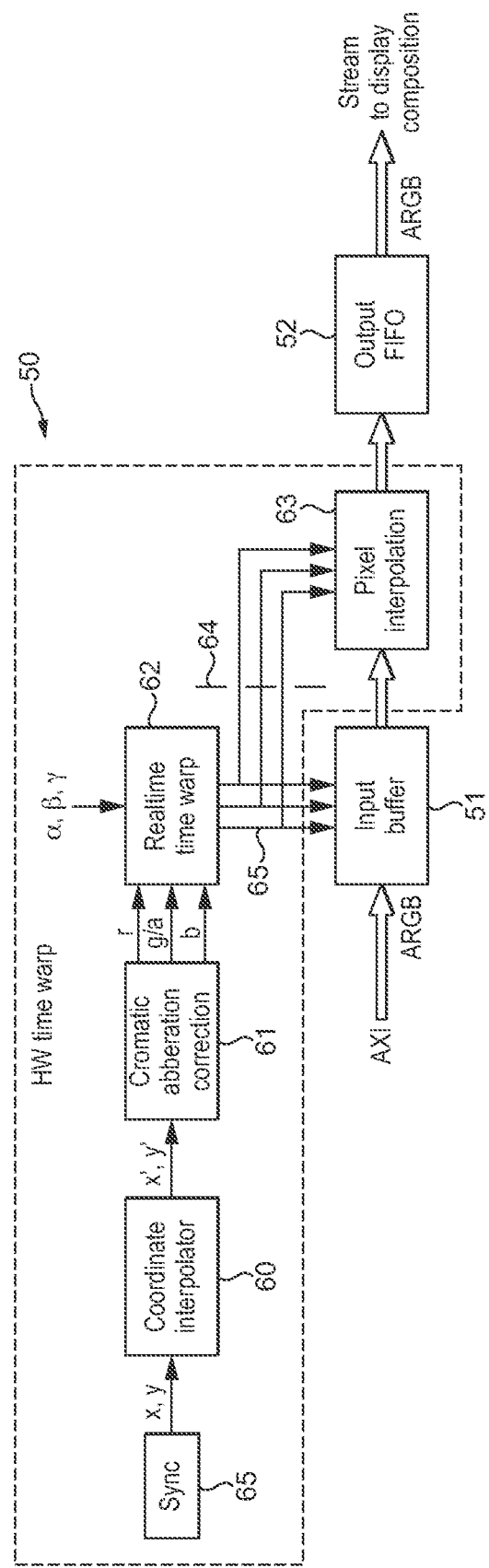
FIG. 5 shows the transformation stage of the display controller of FIG. 4 in more detail.

FIG. 5 shows the timewarp module (transformation stage) 50 of the display controller shown in FIG. 4 in more detail.

As shown in FIG. 5, the timewarp module (transformation stage) 50 of the display controller comprises a number of stages, namely a coordinate interpolator stage 60, a chromatic aberration correction stage 61, a "timewarp" transformation stage 62, and an interpolation stage 63. Each of these stages is in the present embodiment implemented in the form of a fixed-function hardware module (processing circuitry) that is configured to perform a particular processing operation on the input data that it receives, but also has some limited configurability by virtue of the ability to vary certain control parameters for each module. The control parameters are in the present embodiment set by the driver 11 for the display controller 5 when a sequence of frames for a virtual reality display is to be displayed, based on the particular headset (display) 4 that the system is being used with.

Using fixed-function hardware modules for these stages has the advantage that their "timing" for their operations can be known, such that the delivery of output data for display to the display 4 by the display controller 5 at the appropriate rate can be more reliably guaranteed.

Other arrangements would, of course, be possible.

The coordinate interpolator stage 60 operates to determine for a sampling position x, y in the output transformed surface that is to be output from the timewarp module, a corresponding position (coordinate) x', y' in the input frame (in the frame rendered by the GPU 2 that is stored in the memory 3 that is to be displayed to the user) based on a defined lens distortion that corresponds to the lens distortion that will be introduced to the output transformed frame when displayed on the display panel of the display 4 and viewed through the lenses of the head-mounted display.

The coordinate interpolator stage 60 may, for example, execute some form of cubic curve or ellipsoid function for this purpose with, e.g., parameters of that function, such as the focal points of the ellipsoid, being settable by means of control parameters by the driver for the display controller.

Figure 12:
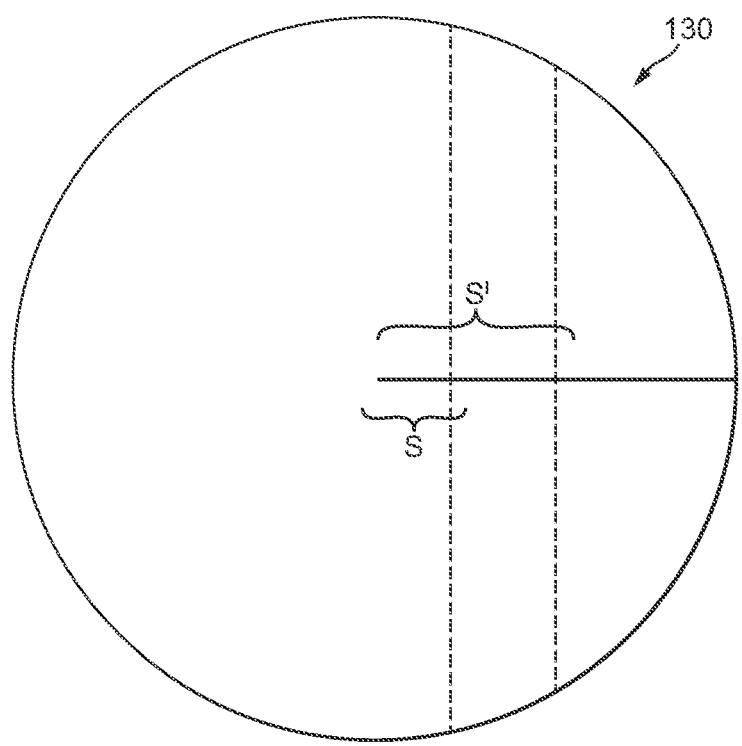
FIG. 12 shows schematically an example of lens distortion correction parameters that can be used in an embodiment of the technology described herein.

FIG. 12 shows an example of lens distortion correction parameters for a spherical lens 130. (This Figure has been simplified for two dimensions.)

In FIG. 12, S represents one configuration of a spherical lens as a distance along a radius from the centre of the lens, and S' represents a different lens configuration as a distance along a radius from the centre of the lens.

In this example both S and S' have the same lens shape, but they alter the amount of distortion on the projection plane (represented by the dashed lines shown in FIG. 12).

The parameterisation shown in FIG. 12 can be extended to ellipses and other generalised shapes, such as cubic curves.

The chromatic aberration correction stage 61, takes the input surface position (coordinates) x', y' determined by the coordinate interpolator stage 60 and "corrects" those coordinates to take account of chromatic aberrations that will be introduced by the lenses of the display 4.

As shown in FIG. 5, a separate chromatic aberration correction is performed for each colour plane (R, G, B). The green colour plane chromatic aberration is also used for the alpha (transparency) plane.

The output of this chromatic aberration correction stage 61 is accordingly three sets of modified input surface positions (coordinates), one set $x_R'$, $y_R'$ for use for sampling the red colour plane in the input surface, one set $x_G'$, $y_G'$ for sampling the green and alpha (transparency) planes in the input surface, and one set $x_B'$, $y_B'$ for sampling the blue plane in the input surface.

The modified input surface positions determined by the chromatic aberration correction stage 61 are then provided to the "timewarp" view orientation transformation stage 62.

This stage takes as its input a set of angles α, β, γ indicative of the user's current head position (which is provided appropriately from the head tracking sensors of the display 4), and which are accordingly indicative of the view orientation that the input surface (frame) is to be rendered as if viewed from for display on the display 4, and operates to generate a projection of the input surface based on the indicated view orientation.

The timewarp (view orientation) transformation stage 62 accordingly performs a further transformation on each input surface position provided by the chromatic aberration correction stage to thereby provide a set of view orientation transformed input surface positions ($x_R''$, $y_R''$), ($x_G''$, $y_G''$), ($x_B''$, $y_B''$) which will then be used to sample the input surface to derive the colour values to be used for the output transformed surface sampling (data element) position x, y, that is currently being generated.

The transformation that the timewarp (view orientation) transformation stage 62 performs on each input surface position may comprise, for example, an x, y shift, scaling and/or rotation. More complex transformations could be applied, if desired. Again, this can be adjusted in use by the driver setting control parameters for the timewarp transformation stage 62, e.g. based on the particular headset (display) 4 that the system is being used with.

The transformed input surface positions determined by the timewarp transformation stage 62 are provided to an interpolation stage 63, which samples the input surface at the indicated positions to determine the input surface values at those respective input surface positions. This is done by appropriate interpolation of the input surface values for defined input surface sampling (data element) positions.

The interpolation of the input surface sampling position data can be performed in any suitable and desired way. In the present embodiment, bilinear interpolation is used, but other arrangements could be used, if desired.

As different input surface positions (coordinates) are determined for the different colour planes (to take account of chromatic aberration), in the present embodiment a separate set of data is accordingly interpolated for the output transformed surface sampling position (data element) for each colour plane (based on the determined input surface position for that colour plane). Thus, the set of RGB colour data for an output transformed surface sampling position (data element) will comprise a red value determined from the determined "red" input surface position (coordinate) ($x_R"$, $y_R"$), a green value determined from the determined "green" input surface position (coordinate) ($x_G"$, $y_G"$), and a blue value determined from the determined "blue" input surface position (coordinate) ($x_B"$, $y_B"$).

The so-separately determined colour plane (e.g. red, green and blue) values are then used together (combined) to provide the colour data for the output transformed surface sampling (data) position (x, y) in question.

Where an alpha (transparency) value is also to be determined, then, as discussed above, that is determined from the input surface position (coordinate) that is used to determine the green colour value.

The interpolated values are then output to the output buffer (FIFO) 52 as shown in FIG. 5, for provision to the remainder of the display controller's display processing pipeline for provision to the display 4 for display to the user.

As shown in FIG. 5, in order that the appropriate input surface data is available for the interpolation stage 63, the modified input surface positions that are determined by the timewarp transformation stage 62 (and that are to be sampled by the interpolation stage 63) are used 65 to control the fetching of the appropriate regions of the input surface containing those sampling positions into the input buffer 51 prior to them being used by the interpolation stage 63.

To do this, the integer parts of the input surface positions determined by the timewarp transformation stage 62 are used to identify the appropriate two-dimensional blocks of the input surface that contain the required input surface data. The input stage then operates to load those respective input surface blocks into the input buffer 51. This is illustrated further in FIG. 7 discussed below.

As also shown in FIG. 5, to allow for latency between requesting input surface data into the input buffer 51 for use by the interpolation stage 63 and the interpolation stage 63 processing that data to provide an output transformed surface sampling position, there may be an appropriate delay (latency-absorbing) mechanism 64 included in the transformation stage. This can be implemented as desired.

As shown in FIG. 5, the operation of the timewarp module (transformation stage) is triggered, and its timing controlled, by receipt of appropriate synchronisation signals 65 from the display 4.

Figure 6:
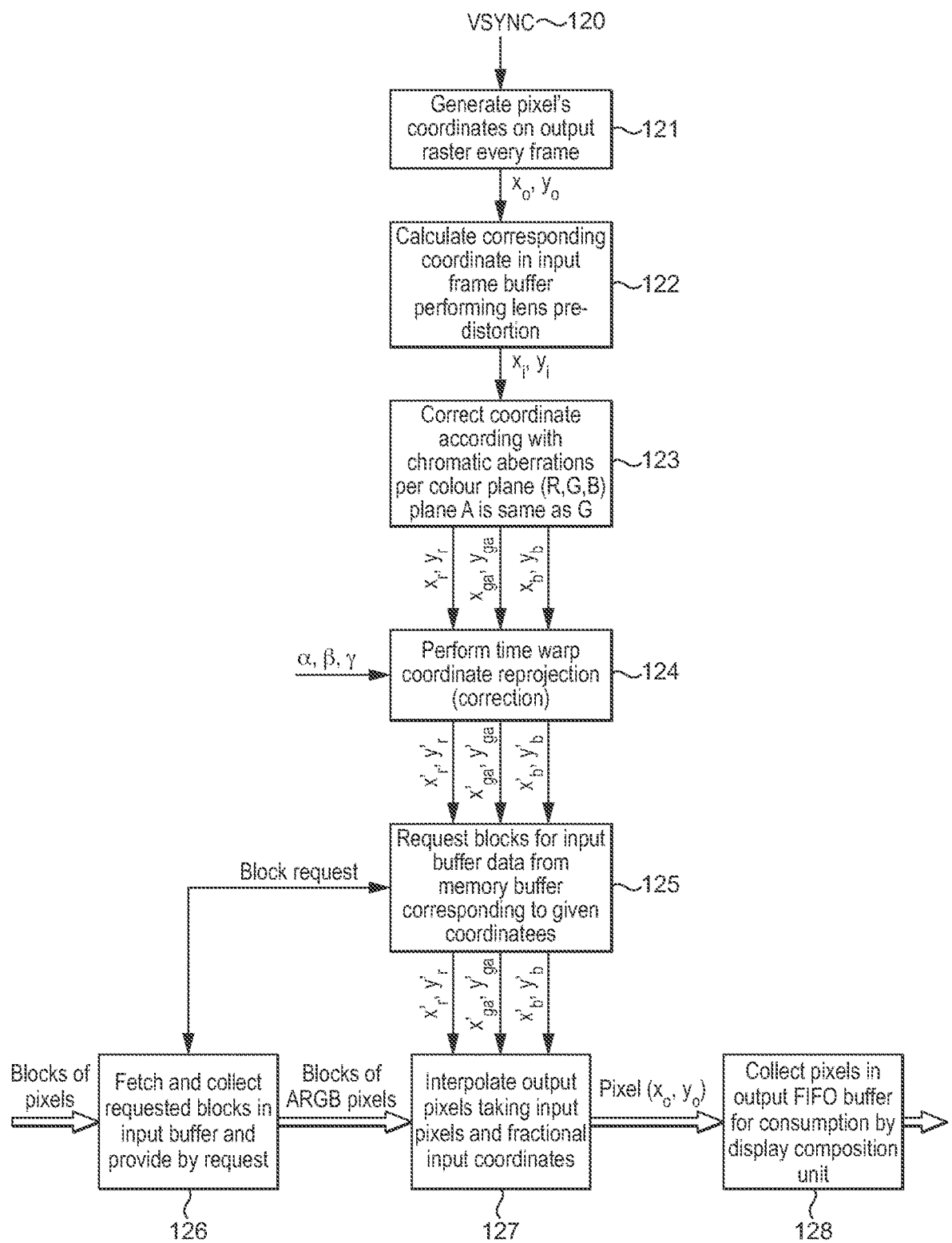
FIG. 6 is a flowchart showing the operation of the transformation stage of the display controller of FIG. 4 in more detail.

FIG. 6 is a flowchart showing the operation of the timewarp module (transformation stage) 50 as shown in FIG. 5.

FIG. 6 shows the operation for a respective pixel (data) position in the output transformed surface that is to be generated for display. This operation is repeated for each output transformed surface pixel (data position) that is required.

As shown in FIG. 6, the process starts with an appropriate synchronisation signal 120 indicating the start of a new output frame for display.

The desired output transformed surface pixel coordinates to be generated next, $x_O$, $y_O$, are then determined (step 121).

The coordinate interpolator stage 60 then operates to determine for the pixel (sampling) position $x_O$, $y_O$, in the output transformed surface that is to be output from the timewarp module, a corresponding position (coordinate) $x_i$, $y_i$ in the input frame (in the frame rendered by the GPU 2 that is stored in the memory 3 that is to be displayed to the user) based on a defined lens distortion that corresponds to the lens distortion that will be introduced to the output transformed frame when displayed on the display panel of the display 4 and viewed through the lenses of the head-mounted display (step 122).

The chromatic aberration correction stage 61 then takes the input surface position (coordinates) $x_i$, $y_i$ determined by the coordinate interpolator stage 60 at step 122 and "corrects" those coordinates to take account of chromatic aberrations that will be introduced by the lenses of the display 4 (step 123), to provide the three sets of modified input surface positions (coordinates) $x_r$, $y_r$; $x_{ga}$, $y_{ga}$; $x_b$, $y_b$.

The modified input surface positions determined by the chromatic aberration correction stage 61 at step 123 are then subjected to the "timewarp" coordinate reprojection (correction) by the transformation stage 62 based on the current input set of angles α, β, γ indicative of the user's current head position (step 124) to thereby provide a set of view orientation transformed input surface positions ($x'_r$, $y'_r$), $x'_{ga}$, $y'_{ga}$), ($x'_b$, $y'_b$).

In the present embodiment, the input head position indicating angles α, β, γ are updated based on the head tracking information provided from the display for each new line of an output timewarp transformed surface that is to be generated. This thereby allows the timewarp transformation process to be adjusted on a line-by-line basis, rather than, for example, having to wait until the start of the next output frame to be displayed. Other arrangements would, of course, be possible.

The so-determined input surface positions are then used, as shown in FIG. 6, to request the fetching of appropriate blocks of the input surface that include the necessary input surface sampling position data into the input buffer to allow the data values for the determined input surface positions to be determined by the interpolation stage 63. This uses the integer part of each determined input surface position to identify which input surface blocks will be required. The identified input surface blocks are then fetched and stored in the input buffer (step 126).

The interpolation stage then reads the appropriate input surface data positions from the input surface blocks stored in the input buffer and interpolates the appropriate data values for the output surface pixel (sampling position) in ($x_O$, $y_O$) in question (step 127).

The so-generated output pixels are then collected in the output buffer for subsequent provision to (and consumption by) the display composition unit and provision to the display for display (step 128).

As shown in FIGS. 5 and 6, the timewarp module (transformation stage) of the display controller 5 generates the output transformed surface to be displayed to the user as a sequence of sampling positions (pixels) in that output transformed surface (on a sampling position-by-sampling position) (pixel-by-pixel) basis.

In the present embodiment, the timewarp module (transformation stage) is configured to generate the output transformed surface raster line-by-raster line (as that is the order in which that output transformed surface will be needed to be provided to the display 4 for display).

Figure 7:
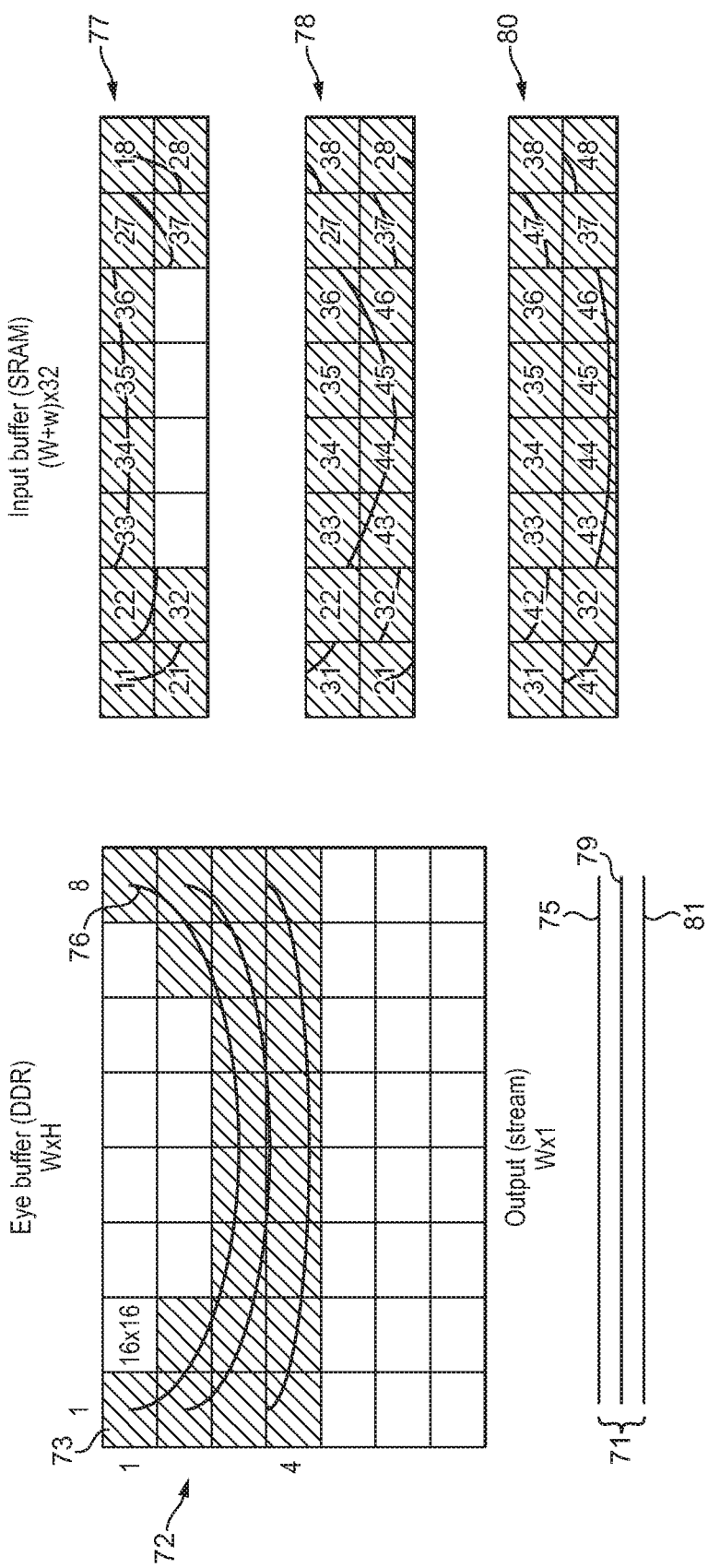
FIG. 7 shows schematically the generation of an output transformed surface for display in an embodiment of the technology described herein.

FIG. 7 illustrates this, and shows three raster lines 71 of an exemplary output transformed surface that will be provided as the output stream from the interpolation stage 63 of the timewarp module (transformation stage).

FIG. 7 also shows the corresponding input surface 72 that is stored in the appropriate frame buffer (the eye buffer) in the memory 33, divided into an array of 16×16 sampling position (pixel) blocks 73 that are, as discussed above, individually loaded into the input buffer for use by the interpolation stage 63 as the lines 71 of the output transformed surface are being generated.

As shown in FIG. 7, because of the, typically barrel, distortion introduced by the lenses in the head-mounted display 4 that the displayed output transformed surface is viewed through, each horizontal raster line 71 in the transformed output surface will in fact correspond to a curved line in the input surface 72. Thus, as shown in FIG. 7, the raster line 75 in the output transformed surface will correspond to a curved line 76 in the input surface 72, and so on.

Thus, as shown in FIG. 7, to generate the raster line 75 in the output transformed surface, a number of different blocks 73 from across the input surface 72 (rather than simply a linear row of blocks from the input surface 72) will need to be loaded into the input buffer. This is illustrated on the right-hand side of FIG. 7, which shows the content 77 of the input buffer needed for processing the raster line 75 in the output transformed surface.

FIG. 7 also shows the content 78 of the input buffer in terms of the blocks from the input surface 72 that are needed when generating the raster line 79 in the output transformed surface, and the content 80 of the input buffer when generating the raster line 81.

As discussed above, the appropriate blocks from the input surface 72 are loaded into the input buffer in response to signals from the timewarp transformation stage 62 indicative of the input surface positions that are going to be needed to generate respective sampling positions in the output transformed surface. The loading of the blocks into the input buffer is controlled in such a manner that any block that is needed for the next line in the output transformed surface is retained in the input buffer until it is no longer needed for the next line of the output transformed surface.

As will be appreciated from the above, the technology described herein, in its embodiments at least, can provide a more efficient mechanism for providing appropriately "timewarped" images for display to a user using a head-mounted virtual reality display system.

This is achieved, in the embodiments of the technology described herein at least, by performing the "timewarping" of a frame to be displayed in the display controller as part of the display controller display processing pipeline operation. In particular, in the embodiments of the technology described herein at least, the display controller is configured to be able to generate a timewarp transformed surface for display from an input surface on a sampling position-by-sampling position (pixel-by-pixel) basis, so as to be able to provide the desired "timewarped" frame for display as a stream of pixels directly to the display for display.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. An integrated circuit operable as a display controller for a data processing system, the integrated circuit being operable to receive, from a memory of the data processing system, graphics processing unit rendered input image data rendered by a graphics processing unit of the data processing system, and to provide output images for display to a display of the data processing system; wherein the integrated circuit comprises:

a local input buffer operable to store blocks of graphics processing unit rendered image data of a graphics processing unit rendered input image that has been rendered with respect to a first view orientation that is based on a first orientation of the display by a graphics processing unit of the data processing system;

input circuitry operable to fetch blocks of graphics processing unit rendered image data of a graphics processing unit rendered input image that has been rendered with respect to a first view orientation that is based on a first orientation of the display by a graphics processing unit of the data processing system from the memory of the data processing system into the local input buffer of the integrated circuit;

output circuitry operable to provide an output image for display to the display of the data processing system;

view orientation data receiving circuitry operable to receive view orientation data indicative of a second orientation of the display of the data processing system; and transformation circuitry operable to:

determine, based on a second orientation of the display of the data processing system indicated by view orientation data received by the view orientation data receiving circuitry of the integrated circuit, one or more positions in a graphics processing unit rendered input image that has been rendered with respect to a first view orientation that is based on a first orientation of the display by a graphics processing unit of the data processing system from which graphics processing unit rendered image data should be sampled in order to provide an output view orientation transformed version of the graphics processing unit rendered input image which represents the graphics processing unit rendered input image as if viewed from a second view orientation that is based on the second orientation of the display of the data processing system indicated by the view orientation data received by the view orientation data receiving circuitry of the integrated circuit;

identify, using the determined one or more positions in the graphics processing unit rendered input image, one or more blocks of graphics processing unit rendered image data of the graphics processing unit rendered input image whose graphics processing unit rendered image data will be required for providing the output view orientation transformed version of the graphics processing unit rendered input image;

cause the input circuitry of the integrated circuit to fetch the identified one or more blocks of graphics processing unit rendered image data of the graphics processing unit rendered input image from the memory of the data processing system into the local input buffer of the integrated circuit;

sample the determined one or more positions in the graphics processing unit rendered input image from blocks of graphics processing unit rendered image data of the graphics processing unit rendered input image stored in the local input buffer of the integrated circuit to provide the output view orientation transformed version of the graphics processing unit rendered input image; and provide the output view orientation transformed version of the graphics processing unit rendered input image to the output circuitry of the integrated circuit for providing as an output image for display to the display of the data processing system.

2. The integrated circuit of claim 1, wherein the transformation circuitry of the integrated circuit is configured to periodically update its transformation operation based on view orientation data newly received by the view orientation data receiving circuitry of the integrated circuit each time a selected number of some but not all lines of the output view orientation transformed version of the graphics processing unit rendered input image have been generated.

3. The integrated circuit of claim 1, wherein:
the transformation circuitry of the integrated circuit is operable to transform a graphics processing unit rendered input image based on a distortion that will be caused by a lens or lenses through which the displayed output transformed image will be viewed by a user.

4. The integrated circuit of claim 1, wherein:
the transformation circuitry of the integrated circuit is operable to transform a graphics processing unit rendered input image based on a chromatic aberration that will be caused by a lens or lenses through which the displayed output transformed image will be viewed by a user.

5. The integrated circuit of claim 4, wherein a separate chromatic aberration correction is determined by the transformation circuitry of the integrated circuit for different colour planes of the graphics processing unit rendered input image.

6. The integrated circuit of claim 1, wherein:
the transformation circuitry of the integrated circuit comprises:
coordinate interpolator circuitry operable to determine for a data position in the view orientation transformed version of the graphics processing unit rendered input image that is to be generated, a corresponding position in the graphics processing unit rendered input image based on a defined lens distortion;
chromatic aberration correction circuitry operable to modify an input image position determined by the coordinate interpolator circuitry to account for chromatic aberration when viewing the view orientation transformed version of the graphics processing unit rendered input image to provide at least one modified input image position; and
view orientation transformation circuitry operable to further modify the at least one modified input image position determined by the chromatic aberration correction circuitry based on view orientation data received by the view orientation data receiving circuitry of the integrated circuit to provide a position of the one or more positions to be sampled to provide sampled image data to use for the data position of the view orientation transformed version of the graphics processing unit rendered input image.

7. The integrated circuit of claim 1, wherein:
the transformation circuitry of the integrated circuit further includes interpolation circuitry that is operable to sample a determined position in the graphics processing unit rendered input image by interpolating plural input image sampling position values to provide an interpolated sampling position value for use for a data position in the output transformed image.

8. The integrated circuit of claim 1, wherein:
the transformation circuitry of the integrated circuit operates to produce the output view orientation transformed version of the graphics processing unit rendered input image on a line-by-line basis, and to identify, using the determined one or more positions in the graphics processing unit rendered input image, one or more blocks of graphics processing unit rendered image data of the graphics processing unit rendered input image whose graphics processing unit rendered image data will be required for generating a line of the output view orientation transformed version of the graphics processing unit rendered input image that is currently being generated.

9. The integrated circuit of claim 1, wherein:
the transformation circuitry of the integrated circuit comprises fixed-function processing circuitry that is configurable by setting one or more control parameters for that circuitry in use.

10. The integrated circuit of claim 1, wherein the output circuitry of the integrated circuit is operable to send pixel data of the output image to the display of the data processing system together with synchronization signals.

11. The integrated circuit of claim 1, wherein the integrated circuit further comprises processing circuitry operable to:
determine whether the graphics processing unit rendered input image is to be transformed by the transformation circuitry of the integrated circuit; and
when it is determined that the graphics processing unit rendered input image is to be transformed by the transformation circuitry of the integrated circuit, cause the transformation circuitry of the integrated circuit to transform the graphics processing unit rendered input image, and to provide the output view orientation transformed version of the graphics processing unit rendered input image to the output circuitry of the integrated circuit for providing as an output image for display to the display of the data processing system; and
when it is not determined that the graphics processing unit rendered input image is to be transformed by the transformation circuitry of the integrated circuit, cause the graphics processing unit rendered input image to be provided to the output circuitry of the integrated circuit for providing as an output image for display to the display of the data processing system.

12. The integrated circuit of claim 1, wherein the input circuitry of the integrated circuit is operable to determine whether a block of graphics processing unit rendered image data of the graphics processing unit rendered input image is already present in the local input buffer of the integrated circuit, and to fetch the block of graphics processing unit rendered image data of the graphics processing unit rendered input image from the memory of the data processing system into the local input buffer of the integrated circuit if it is determined that the block of graphics processing unit rendered image data of the graphics processing unit rendered input image is not already present in the local input buffer of the integrated circuit.

13. The integrated circuit of claim 1, wherein each block of graphics processing unit rendered image data comprises plural graphics processing unit rendered image elements, wherein each graphics processing unit rendered image element is rendered by a graphics processing unit of the data processing system.

14. A data processing system comprising:
a main memory;
a display;
one or more view orientation determining sensors operable to sense a second orientation of the display;

a graphics processing unit operable to render images and to store rendered images in the main memory; and an integrated circuit operable as a display controller as claimed in claim 1;

wherein the input circuitry of the integrated circuit is operable to fetch data of an image rendered by the graphics processing unit from the main memory; and wherein the view orientation data receiving circuitry of the integrated circuit is operable to receive view orientation data indicative of a second orientation of the display from the one or more view orientation determining sensors.

15. A display device comprising:

a display; and an integrated circuit operable as a display controller, the integrated circuit being operable to receive, from a memory of a data processing system, graphics processing unit rendered input image data rendered by a graphics processing unit of the data processing system, and to provide output images for display to the display;

wherein the integrated circuit comprises:

a local input buffer operable to store blocks of graphics processing unit rendered image data of a graphics processing unit rendered input image that has been rendered with respect to a first view orientation that is based on a first orientation of the display by a graphics processing unit of the data processing system;

input circuitry operable to fetch blocks of graphics processing unit rendered image data of a graphics processing unit rendered input image that has been rendered with respect to a first view orientation that is based on a first orientation of the display by a graphics processing unit of the data processing system from the memory of the data processing system into the local input buffer of the integrated circuit;

output circuitry operable to provide an output image for display to the display;

view orientation data receiving circuitry operable to receive view orientation data indicative of a second orientation of the display; and transformation circuitry operable to:

determine, based on a second orientation of the display indicated by view orientation data received by the view orientation data receiving circuitry of the integrated circuit, one or more positions in a graphics processing unit rendered input image that has been rendered with respect to a first view orientation that is based on a first orientation of the display by a graphics processing unit of the data processing system from which graphics processing unit rendered image data should be sampled in order to provide an output view orientation transformed version of the graphics processing unit rendered input image which represents the graphics processing unit rendered input image as if viewed from a second view orientation that is based on the second orientation of the display indicated by the view orientation data received by the view orientation data receiving circuitry of the integrated circuit;

identify, using the determined one or more positions in the graphics processing unit rendered input image, one or more blocks of graphics processing unit rendered image data of the graphics processing unit rendered input image whose graphics processing unit rendered image data will be required for providing the output view orientation transformed version of the graphics processing unit rendered input image;

cause the input circuitry of the integrated circuit to fetch the identified one or more blocks of graphics processing unit rendered image data of the graphics processing unit rendered input image from the memory of the data processing system into the local input buffer of the integrated circuit;

sample the determined one or more positions in the graphics processing unit rendered input image from blocks of graphics processing unit rendered image data of the graphics processing unit rendered input image stored in the local input buffer of the integrated circuit to provide the output view orientation transformed version of the graphics processing unit rendered input image; and provide the output view orientation transformed version of the graphics processing unit rendered input image to the output circuitry of the integrated circuit for providing as an output image for display to the display.

16. The device of claim 15, wherein the transformation circuitry of the integrated circuit comprises:

coordinate interpolator circuitry operable to determine for a data position in the output view orientation transformed version of the graphics processing unit rendered input image that is to be generated, a corresponding position in the graphics processing unit rendered input image based on a defined lens distortion;

chromatic aberration correction circuitry operable to modify an input image position determined by the coordinate interpolator circuitry to account for chromatic aberration when viewing the output view orientation transformed version of the graphics processing unit rendered input image to provide at least one modified input image position; and view orientation transformation circuitry operable to further modify the at least one modified input image position determined by the chromatic aberration correction circuitry based on view orientation data received by the view orientation data receiving circuitry of the integrated circuit to provide a position of the one or more positions to be sampled to provide graphics processing unit rendered image data to use for the data position of the output view orientation transformed version of the graphics processing unit rendered input image.

17. A method of operating an integrated circuit that is operable as a display controller in a data processing system, the integrated circuit being operable to receive, from a memory of the data processing system, graphics processing unit rendered input image data rendered by a graphics processing unit of the data processing system, and to provide output images for display to a display of the data processing system, wherein the integrated circuit comprises:

a local input buffer operable to store blocks of graphics processing unit rendered image data of a graphics processing unit rendered input image that has been rendered with respect to a first view orientation that is based on a first orientation of the display by a graphics processing unit of the data processing system;

input circuitry operable to fetch blocks of graphics processing unit rendered image data of a graphics processing unit rendered input image that has been rendered with respect to a first view orientation that is based on a first orientation of the display by a graphics processing unit of the data processing system from the memory of the data processing system into the local input buffer of the integrated circuit;

output circuitry operable to provide an output image for display to the display of the data processing system;

view orientation data receiving circuitry operable to receive view orientation data indicative of a second orientation of the display of the data processing system; and transformation circuitry operable to:
    determine, based on a second orientation of the display of the data processing system indicated by view orientation data received by the view orientation data receiving circuitry of the integrated circuit, one or more positions in a graphics processing unit rendered input image that has been rendered with respect to a first view orientation that is based on a first orientation of the display by a graphics processing unit of the data processing system from which graphics processing unit rendered image data should be sampled in order to provide an output view orientation transformed version of the graphics processing unit rendered input image which represents the graphics processing unit rendered input image as if viewed from a second view orientation that is based on the second orientation of the display of the data processing system indicated by the received view orientation data received by the view orientation data receiving circuitry of the integrated circuit;
    identify, using the determined one or more positions in the graphics processing unit rendered input image, one or more blocks of graphics processing unit rendered image data of the graphics processing unit rendered input image whose graphics processing unit rendered image data will be required for providing the output view orientation transformed version of the graphics processing unit rendered input image;
    cause the input circuitry of the integrated circuit to fetch the identified one or more blocks of graphics processing unit rendered image data of the graphics processing unit rendered input image from the memory of the data processing system into the local input buffer of the integrated circuit;
    sample the determined one or more positions in the graphics processing unit rendered input image from blocks of graphics processing unit rendered image data of the graphics processing unit rendered input image stored in the local input buffer of the integrated circuit to provide the output view orientation transformed version of the graphics processing unit rendered input image; and
    provide the output view orientation transformed version of the graphics processing unit rendered input image to the output circuitry of the integrated circuit for providing as an output image for display to the display of the data processing system;

the method comprising:

the view orientation data receiving circuitry of the integrated circuit receiving view orientation data indicative of a second orientation of the display of the data processing system;

the transformation circuitry of the integrated circuit:
    determining, based on the second orientation of the display of the data processing system indicated by the view orientation data received by the view orientation data receiving circuitry of the integrated circuit, one or more positions in a graphics processing unit rendered input image that has been rendered with respect to a first view orientation that is based on a first orientation of the display by a graphics processing unit of the data processing system from which graphics processing unit rendered image data should be sampled in order to provide an output view orientation transformed version of the graphics processing unit rendered input image which represents the graphics processing unit rendered input image as if viewed from a second view orientation that is based on the second orientation of the display of the data processing system indicated by the view orientation data received by the view orientation data receiving circuitry of the integrated circuit;
    identifying, using the determined one or more positions in the graphics processing unit rendered input image, one or more blocks of graphics processing unit rendered image data of the graphics processing unit rendered input image whose graphics processing unit rendered image data will be required for providing the output view orientation transformed version of the graphics processing unit rendered input image;
    causing the input circuitry of the integrated circuit to fetch the identified one or more blocks of graphics processing unit rendered image data of the graphics processing unit rendered input image from the memory of the data processing system into the local input buffer of the integrated circuit;
    sampling the determined one or more positions in the graphics processing unit rendered input image from blocks of graphics processing unit rendered image data of the graphics processing unit rendered input image stored in the local input buffer of the integrated circuit to provide the output view orientation transformed version of the graphics processing unit rendered input image; and
    providing the output view orientation transformed version of the graphics processing unit rendered input image to the output circuitry of the integrated circuit for providing as an output image for display to the display of the data processing system; and the output circuitry of the integrated circuit providing the output view orientation transformed version of the graphics processing unit rendered input image to the display of the data processing system for display.

18. The method of claim 17, further comprising the transformation circuitry of the integrated circuit periodically updating its transformation operation based on view orientation data newly received by the view orientation data receiving circuitry of the integrated circuit each time a selected number of some but not all lines of the output view orientation transformed version of the graphics processing unit rendered input image have been generated.

19. The method of claim 17, further comprising:
the transformation circuitry of the integrated circuit transforming the graphics processing unit rendered input image based on a distortion that will be caused by a lens or lenses through which the displayed output transformed image will be viewed by a user.

20. The method of claim 17, further comprising:
the transformation circuitry of the integrated circuit transforming the graphics processing unit rendered input image based on a chromatic aberration that will be caused by a lens or lenses through which the displayed output transformed image will be viewed by a user.

21. The method of claim 20, wherein a separate chromatic aberration correction is determined by the transformation circuitry of the integrated circuit for different colour planes of the graphics processing unit rendered input image.

22. The method of claim 17, wherein the transformation circuitry of the integrated circuit transforms the graphics processing unit rendered input image to provide the view orientation transformed version of the graphics processing unit rendered input image based on received view orientation data by:
  determining for a data position in the view orientation transformed version of the graphics processing unit rendered input image that is to be output, a corresponding position in the graphics processing unit rendered input image based on a defined lens distortion;
  modifying the determined input image position to account for chromatic aberration when viewing the view orientation transformed version of the graphics processing unit rendered input image to provide at least one modified input image position; and
  further modifying the determined at least one modified input image position based on view orientation data received by the view orientation data receiving circuitry of the integrated circuit to provide a position of the one or more positions in the graphics processing unit rendered input image to be sampled to provide sampled image data to use for the data position of the view orientation transformed version of the graphics processing unit rendered input image.

23. The method of claim 17, further comprising:
  the transformation circuitry of the integrated circuit sampling a determined position in the graphics processing unit rendered input image by interpolating plural input image sampling position values to provide an interpolated sampling position value for use for a data position in the output transformed image.

24. The method of claim 17, wherein:
  the transformation circuitry of the integrated circuit produces the output view orientation transformed version of the graphics processing unit rendered input image on a line-by-line basis, and identifies, using the determined one or more positions in the graphics processing unit rendered input image, one or more blocks of graphics processing unit rendered image data of the graphics processing unit rendered input image whose graphics processing unit rendered image data will be required for generating a line of the output view orientation transformed version of the graphics processing unit rendered input image that is currently being generated.

25. The method of claim 17, further comprising:
  a driver for the integrated circuit setting one or more control parameters for the transformation circuitry of the integrated circuit to configure that circuitry in use.

26. A non-transitory computer readable storage medium storing computer software code which when executing on a processor performs a method of operating an integrated circuit that is operable as a display controller in a data processing system, the integrated circuit being operable to receive, from a memory of the data processing system, graphics processing unit rendered input image data rendered by a graphics processing unit of the data processing system, and to provide output images for display to a display of the data processing system, wherein the integrated circuit comprises:
  a local input buffer operable to store blocks of graphics processing unit rendered image data of a graphics processing unit rendered input image that has been rendered with respect to a first view orientation that is based on a first orientation of the display by a graphics processing unit of the data processing system;
  input circuitry operable to fetch blocks of graphics processing unit rendered image data of a graphics processing unit rendered input image that has been rendered with respect to a first view orientation that is based on a first orientation of the display by a graphics processing unit of the data processing system from the memory of the data processing system into the local input buffer of the integrated circuit;
  output circuitry operable to provide an output image for display to the display of the data processing system;
  view orientation data receiving circuitry operable to receive view orientation data indicative of a second orientation of the display of the data processing system; and
  transformation circuitry operable to:
    determine, based on a second orientation of the display of the data processing system indicated by view orientation data received by the view orientation data receiving circuitry of the integrated circuit, one or more positions in a graphics processing unit rendered input image that has been rendered with respect to a first view orientation that is based on a first orientation of the display by a graphics processing unit of the data processing system from which graphics processing unit rendered image data should be sampled in order to provide an output view orientation transformed version of the graphics processing unit rendered input image which represents the graphics processing unit rendered input image as if viewed from a second view orientation that is based on the second orientation of the display of the data processing system indicated by the view orientation data received by the view orientation data receiving circuitry of the integrated circuit;
    identify, using the determined one or more positions in the graphics processing unit rendered input image, one or more blocks of graphics processing unit rendered image data of the graphics processing unit rendered input image whose graphics processing unit rendered image data will be required for providing the output view orientation transformed version of the graphics processing unit rendered input image;
    cause the input circuitry of the integrated circuit to fetch the identified one or more blocks of graphics processing unit rendered image data of the graphics processing unit rendered input image from the memory of the data processing system into the local input buffer of the integrated circuit;
    sample the determined one or more positions in the graphics processing unit rendered input image from blocks of graphics processing unit rendered image data of the graphics processing unit rendered input image stored in the local input buffer of the integrated circuit display controller to provide the output view orientation transformed version of the graphics processing unit rendered input image; and
    provide the output view orientation transformed version of the graphics processing unit rendered input image to the output circuitry of the integrated circuit for providing as an output image for display to the display of the data processing system;
  the method comprising:
  the view orientation data receiving circuitry of the integrated circuit receiving view orientation data indicative of a second orientation of the display of the data processing system;
  the transformation circuitry of the integrated circuit:

determining, based on the second orientation of the display of the data processing system indicated by the view orientation data received by the view orientation data receiving circuitry of the integrated circuit, one or more positions in a graphics processing unit rendered input image that has been rendered with respect to a first view orientation that is based on a first orientation of the display by a graphics processing unit of the data processing system from which graphics processing unit rendered image data should be sampled in order to provide an output view orientation transformed version of the graphics processing unit rendered input image which represents the graphics processing unit rendered input image as if viewed from a second view orientation that is based on the second orientation of the display of the data processing system indicated by the view orientation data received by the view orientation data receiving circuitry of the integrated circuit;

identifying, using the determined one or more positions in the graphics processing unit rendered input image, one or more blocks of graphics processing unit rendered image data of the graphics processing unit rendered input image whose graphics processing unit rendered image data will be required for providing the output view orientation transformed version of the graphics processing unit rendered input image;

causing the input circuitry of the integrated circuit to fetch the identified one or more blocks of graphics processing unit rendered image data of the graphics processing unit rendered input image from the memory of the data processing system into the local input buffer of the integrated circuit;

sampling the determined one or more positions in the graphics processing unit rendered input image from blocks of graphics processing unit rendered image data of the graphics processing unit rendered input image stored in the local input buffer of the integrated circuit to provide the output view orientation transformed version of the graphics processing unit rendered input image; and providing the output view orientation transformed version of the graphics processing unit rendered input image to the output circuitry of the integrated circuit for providing as an output image for display to the display of the data processing system; and the output circuitry of the integrated circuit providing the output view orientation transformed version of the graphics processing unit rendered input image to the display of the data processing system for display.

* * * * *

UNITED STATES PATENT AND TRADEMARK OFFICE
CERTIFICATE OF CORRECTION

PATENT NO. : 11,127,110 B2
APPLICATION NO. : 15/446997
DATED : September 21, 2021
INVENTOR(S) : Ian Rudolf Bratt et al.

It is certified that error appears in the above-identified patent and that said Letters Patent is hereby corrected as shown below:

In the Claims

Column 35, Line 24 (Claim 17) please change "the received view" to -- the view --

Column 38, Line 54 (Claim 26) please change "circuit display controller to" to -- circuit to --

Signed and Sealed this
Seventeenth Day of May, 2022

Katherine Kelly Vidal
*Director of the United States Patent and Trademark Office*